(12) United States Patent
Takase et al.

(10) Patent No.: US 9,385,944 B2
(45) Date of Patent: Jul. 5, 2016

(54) COMMUNICATION SYSTEM, PATH SWITCHING METHOD AND COMMUNICATION DEVICE

(71) Applicant: HITACHI, LTD., Tokyo (JP)

(72) Inventors: Masayuki Takase, Tokyo (JP); Hideki Endo, Tokyo (JP); Yoshihiro Ashi, Tokyo (JP); Taisuke Ueta, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 14/108,977

(22) Filed: Dec. 17, 2013

(65) Prior Publication Data
US 2014/0185429 A1    Jul. 3, 2014

(30) Foreign Application Priority Data

Dec. 28, 2012  (JP) .................................. 2012-286938

(51) Int. Cl.
| | |
|---|---|
| *H04L 12/26* | (2006.01) |
| *H04L 12/703* | (2013.01) |
| *H04L 12/707* | (2013.01) |
| *H04L 12/725* | (2013.01) |
| *H04L 12/775* | (2013.01) |

(52) U.S. Cl.
CPC ................ *H04L 45/28* (2013.01); *H04L 45/22* (2013.01); *H04L 45/30* (2013.01); *H04L 45/58* (2013.01)

(58) Field of Classification Search
CPC ................................ H04L 45/28; H04L 45/22
See application file for complete search history.

(56) References Cited

U.S. PATENT DOCUMENTS

| | | | | |
|---|---|---|---|---|
| 7,599,283 | B1 * | 10/2009 | Varier ................... | H04L 45/586 370/216 |
| 2007/0133433 | A1 * | 6/2007 | Nam ....................... | H04L 12/24 370/254 |
| 2011/0241432 | A1 * | 10/2011 | Nishioka ............. | H04L 25/0272 307/80 |

FOREIGN PATENT DOCUMENTS

| | | |
|---|---|---|
| JP | 2006-311254 A | 11/2006 |
| JP | 2011-142383 A | 7/2011 |

* cited by examiner

*Primary Examiner* — Chandrahas Patel
*Assistant Examiner* — Lan Huong Truong
(74) *Attorney, Agent, or Firm* — Volpe and Koenig, P.C.

(57) ABSTRACT

When a communication path between a user site and a dual-homed data center is made redundant, a communication between the user site and a server within a data center can be continued. An edge node DCE-1 of a data center 40-1 and edge nodes TPE-1, TPE-2 of a transport network are connected to each other by a link TPE-1-1 and a link TPE-2-1, respectively. The edge nodes TPE-3 and TPE-1, TPE-2 that hold a node AE 51 of a user site 50 are set with an LSP 110 of an active system, and an LSP 120 of a backup system, respectively. One of the links is active, and the other link is backup, and the LSP of the TPE node having the active link in the LSP 100 and the LSP 120 is made active. The respective links are prioritized, and the links are switched to an active state in order from the links higher in the order of priority when a link failure or an LSP failure occurs.

15 Claims, 23 Drawing Sheets

TRANSPORT SYSTEM OF FIRST EMBODIMENT

TRANSPORT SYSTEM OF FIRST EMBODIMENT

| REDUNDANT GROUP ID | PRIMARY NODE CONNECTION (COUNTER DEVICE) | | SECONDARY NODE CONNECTION (COUNTER DEVICE) | | CONFOUNDING LSP ID | CONFOUNDING LSP STATE |
|---|---|---|---|---|---|---|
| | PRIMARY LINK 1 | PRIMARY LINK 2 | SECONDARY LINK 1 | SECONDARY LINK 2 | | |
| 1 | TPE-1-1 | TPE-2-1 | TPE-1-2 | TPE-2-2 | 100 | NORMAL |

REDUNDANCY GROUP MANAGEMENT DATABASE

LINK STATE MANAGEMENT DATABASE 92

| LINK ID 211 | BELONGING REDUNDANT GROUP ID 212 | REDUNDANCY PRIORITY 213 | LINK STATE 214 | HELD LSP STATE 215 | OPERATING STATE 216 |
|---|---|---|---|---|---|
| TPE-1-1 | 1 | 1 | NORMAL | NORMAL | ACT |
| TPE-2-1 | 1 | 2 | NORMAL | NORMAL | SBY |
| TPE-1-2 | 1 | 3 | NORMAL | NORMAL | SBY |
| TPE-2-2 | 1 | 4 | NORMAL | NORMAL | SBY |

| LSP ID | LINK ID | LSP STATE | OPERATING STATE | PAIRED LSP ID |
|---|---|---|---|---|
| 110 | TPE-1-1/TPE-1-2 | NORMAL | ACT | 120 |
| | | | | |
| | | | | |

LSP MANAGEMENT DATABASE

FIG.5

SELF-NODE LINK STATE MANAGEMENT DB

DB EXCHANGE PACKET BY CONFOUNDING LSP

FLOWCHART OF LINK FAILURE DETECTION(1/2)

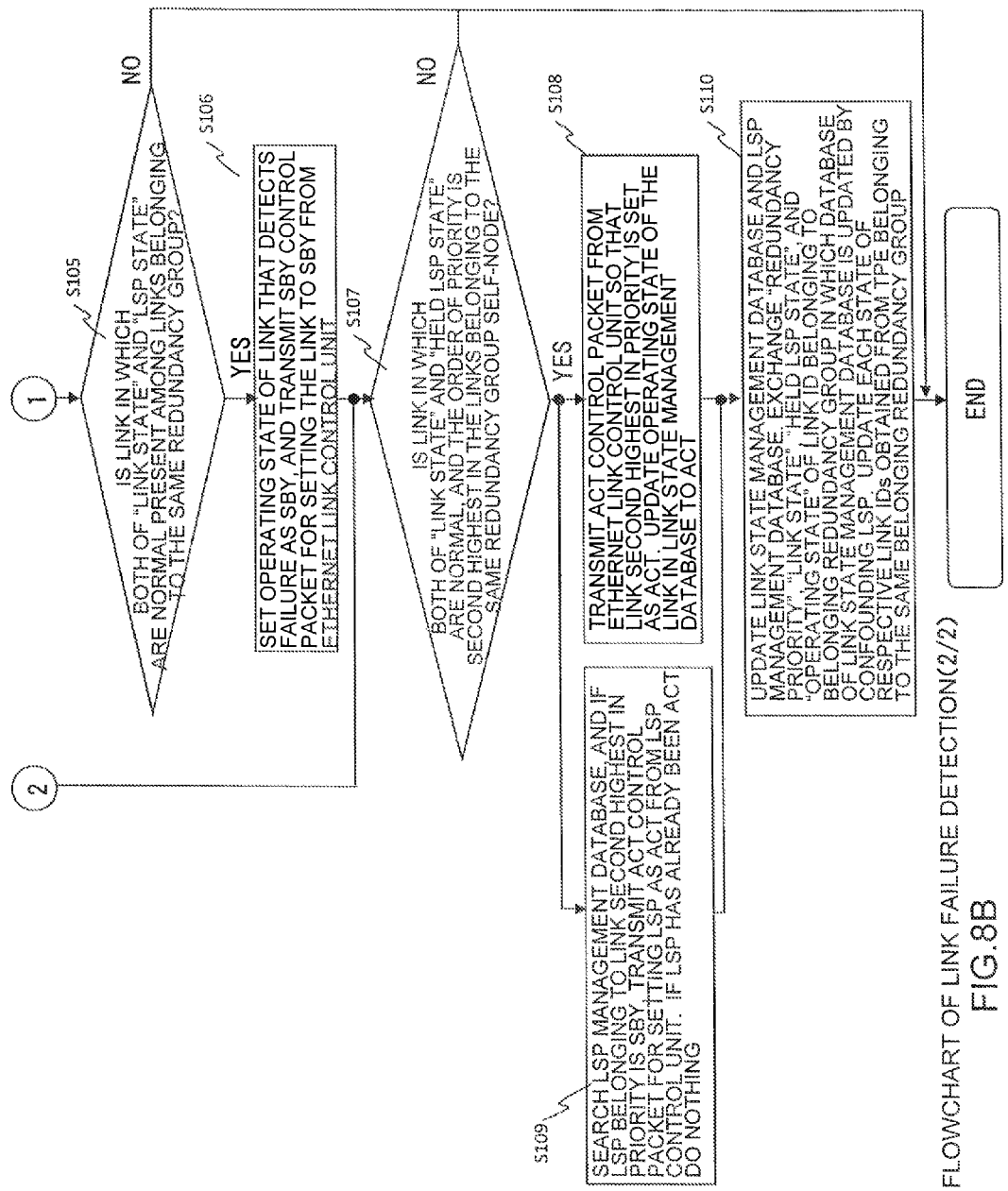
FIG.8B FLOWCHART OF LINK FAILURE DETECTION(2/2)

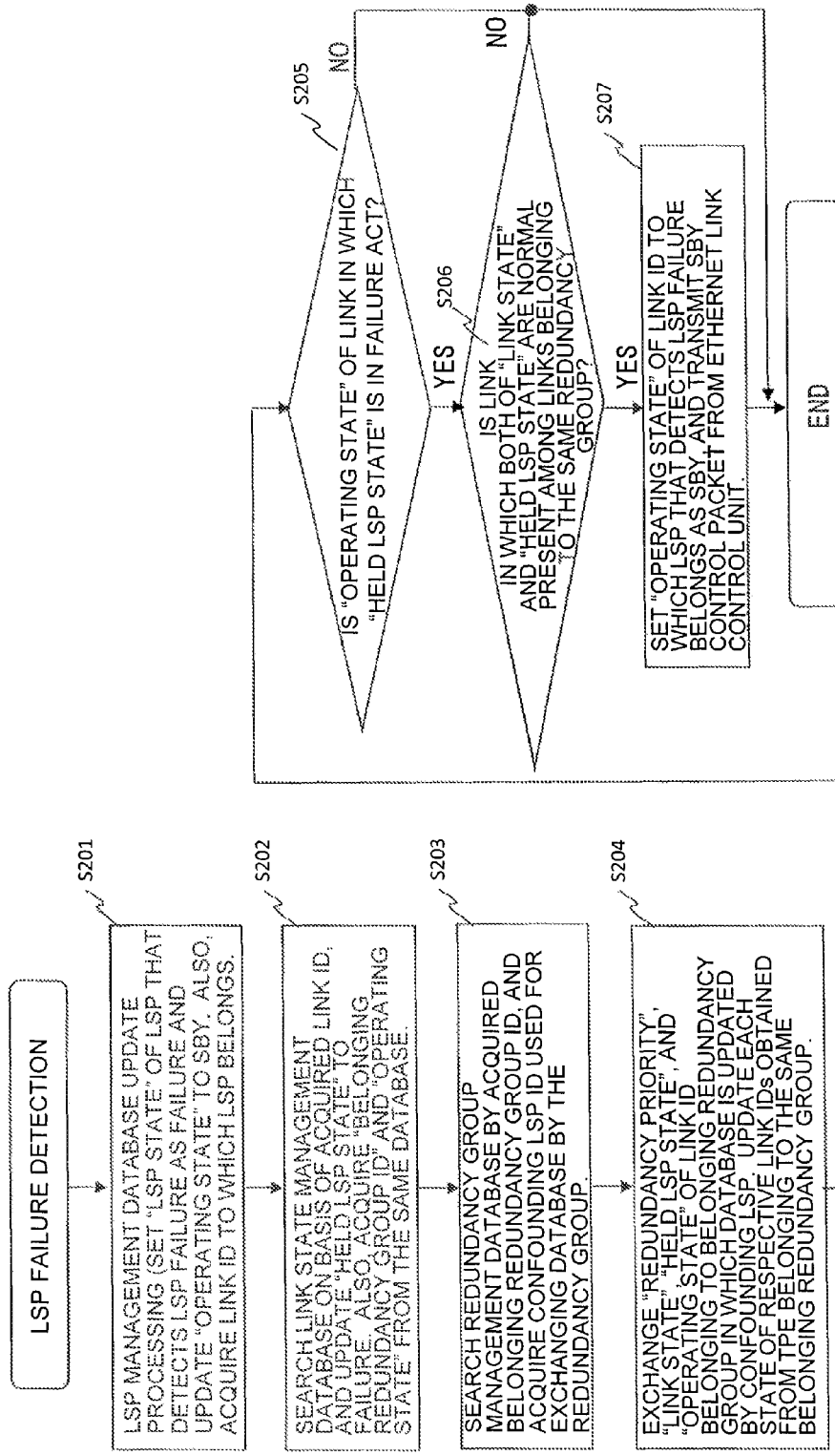
FIG.9 FLOWCHART OF LSP FAILURE DETECTION

FLOWCHART OF CONFOUNDING LSP FAILURE DETECTION

FLOWCHART OF LSP SWITCHING ACT
CONTROL PACKET RECEPTION

RECEIVE DB EXCHANGE NOTIFICATION PACKET IN WHICH DB UPDATE FLAG IS "WITH UPDATED INFORMATION" FROM CONFOUNDING LSP

TRANSPORT SYSTEM OF SECOND EMBODIMENT

BLOCK DIAGRAM OF TRANSPORT EDGE NODE OF SECOND EMBODIMENT

| LSP ID | LINK ID | LSP STATE | OPERATING STATE | LSP GROUP ID |
|---|---|---|---|---|
| 110 | TPE-1-1/TPE-1-2 | NORMAL | ACT | 1000 |
| 210 | TPE-1-1/TPE-1-2 | NORMAL | SBY | 1000 |
| | | | | |

LSP MANAGEMENT DATABASE OF SECOND EMBODIMENT

FIG.15

| LSP GROUP ID | PRIMARY NODE/BELONGING LSP ID | | SECONDARY/NODE BELONGING LSP ID | |
|---|---|---|---|---|
| | P-SYSTEM LSP ID | S-SYSTEM LSP ID | P-SYSTEM LSP ID | S-SYSTEM LSP ID |
| 1000 | 110 | 210 | 120 | 220 |
| | | | | |
| | | | | |
| | | | | |
| | | | | |

REDUNDANT LSP MANAGEMENT DATABASE OF SECOND EMBODIMENT

FIG.16

FLOWCHART OF LINK FAILURE DETECTION(1/2)

FLOWCHART OF LINK FAILURE DETECTION (2/2)

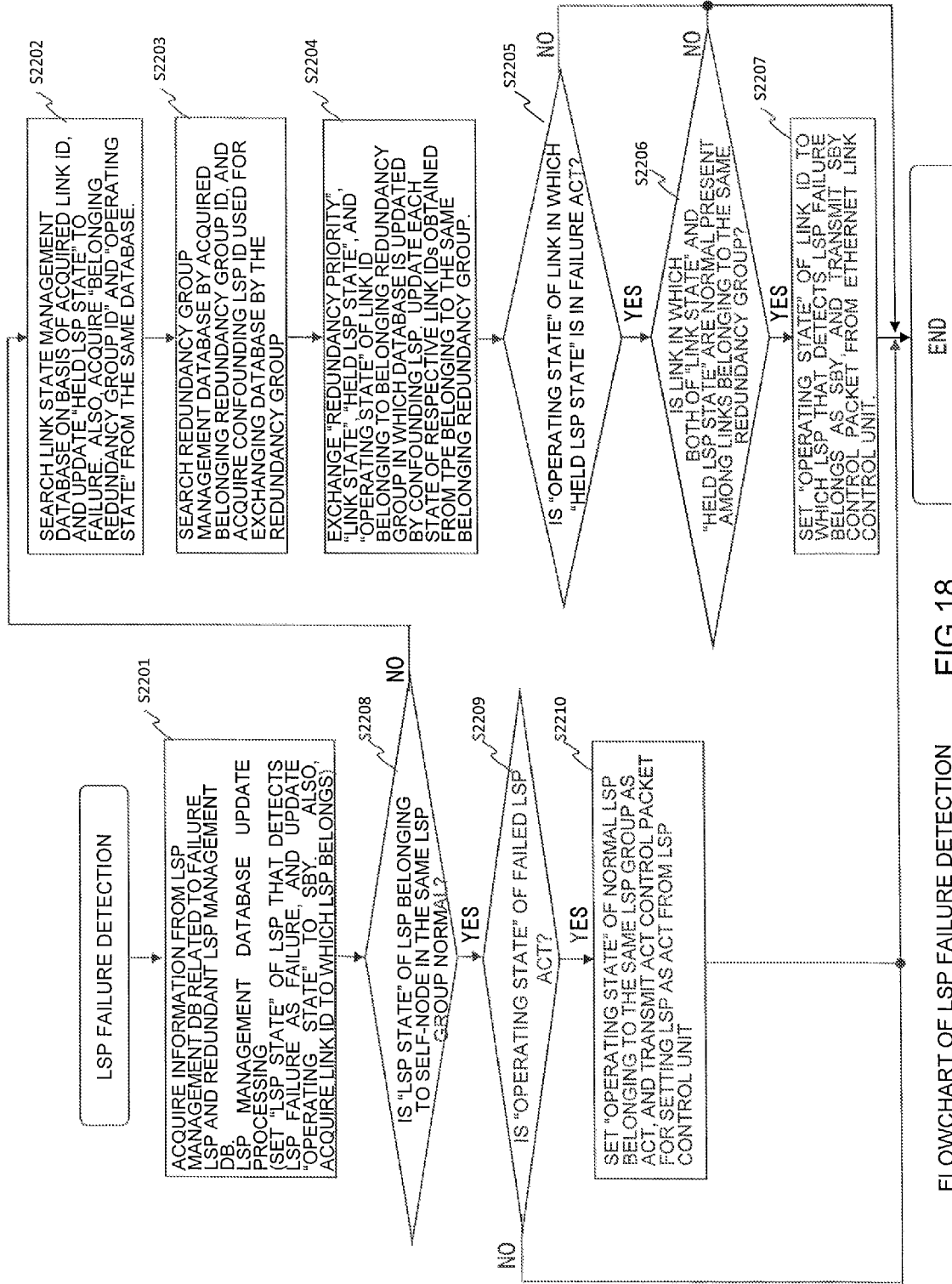
FIG.18 FLOWCHART OF LSP FAILURE DETECTION

FLOWCHART OF CONFOUNDING LSP FAILURE DETECTION

FLOWCHART OF LSP SWITCHING ACT
CONTROL PACKET RECEPTION

RECEIVE DB EXCHANGE NOTIFICATION PACKET IN WHICH DB UPDATE FLAG IS "WITH UPDATED INFORMATION" FROM CONFOUNDING LSP

COMMUNICATION SYSTEM, PATH SWITCHING METHOD AND COMMUNICATION DEVICE

CLAIM OF PRIORITY

The present application claims priority from Japanese patent application JP 2012-286938 filed on Dec. 28, 2012, the content of which is hereby incorporated by reference into this application.

BACKGROUND OF THE INVENTION

1. Field of the Invention

The present invention relates to a communication system, a path switching method, and a communication device, and more particularly to a communication system, a path switching method, and a communication device which provide an end-to-end redundant path of a communication path in an environment in which two or more kinds of redundant protocols are mixed together.

2. Description of the Background Art

IT service providing configurations using a communication network represented by a cloud service are increased. Since a service use response and continuity is important in an IT service using this communication network, a high quality and a high reliability are demanded for the communication network.

As a communication technology for realizing a communication path with the high quality and the high reliability, there is a packet transport. The packet transport represents a technique mainly used in a wide area network (WAN) of a communication carrier. The packet transport is configured by a transport edge node (TPE) that is arranged in an edge of a WAN, and holds communication devices of WAN users, a transport (TP) node that is arranged as a relay device of the WAN, and a network management system (NMS).

In the WAN configured by a packet transport, a connection oriented path is set for the TPE node and the TP node from the NMS. For that reason, the path can be set taking a bandwidth resource of the TP node into consideration to enable the high-quality communication to be provided. Also, in the packet transport, an operation administration and maintenance (OAM) and an autoprotection switching (APS) of the set path are standardized to provide the high-reliability communication path.

Also, as a higher reliability of a data center (DC) providing the cloud service, the DC may be geographically subjected to dual homing so that the IT service can be provided even if the overall DC cannot be used by a natural disaster.

Also, users who use the DC and the cloud service are frequently connected to the transport network by an Ethernet (registered network) access link. Therefore, in the network system providing the cloud service, all of the DC, the Ethernet access link, and the transport network are subjected to the dual homing so that the higher reliability of the system is expected.

Under the above background, there are techniques for realizing the network redundancy as disclosed in JP-A-2006-311254 and JP-A-2011-142383. JP-A-2006-311254 discloses the technique for providing a redundancy of a router and a redundancy of an access path to the router. JP-A-2011-142383 discloses, for example, a technique providing switching means when the dual-homed site and the user site are connected to each other by an access link and a transport path.

SUMMARY OF THE INVENTION

A technique 1 disclosed in JP-A-2006-311254 provides a redundant path of two communication devices (router) by an optical path. However, since the redundant path is autonomously calculated and set by each communication device after a failure occurs, there arises a problem that a communication quality is adversely affected when a plurality of paths is unevenly set for a certain communication node. Also, there arises such a problem that the provision of the redundant path is limited within one communication protocol, and there is no disclosure of means for providing the redundant path in the NW in which different protocols such as the Ethernet access link and the transport path are connected.

A technique 2 disclosed in JP-A-2011-142383 provides failure switching means at the respective points of an access link failure and a transport path failure. However, the DC accessed from a user site is switched to another even if any point fails. For that reason, there arise such problems that when the system is switched to another while the user is accessing to the DC, a communication of the user ceases once, and data information which is being processed is lost.

In view of the above problems with the related art, an object of the present invention is to provide a communication system, a path switching method, and a communication device in which a path in a first network, a path in a second network, and a communication device between the first network and the second network can be made redundant, and a redundant communication device switches a path extending between the first network and the second network to another.

According to the first solving means of the present invention, there is provide a communication system comprising:

a first communication device that is arranged between a first network and a second network, communicates with a first device of the first network through a first access link, communicates with a second device, which is made redundant with the first device, of the first network through a second access link, and communicates with a third device of the second network through a first path;

a second communication device that is arranged between the first network and the second network, communicates with a first device of the first network through a third access link, communicates with the second device of the first network through a fourth access link, and communicates with the third device of the second network through a second path; and a synchronization information communication path between the first communication device and the second communication device, wherein the first communication device and the second communication device each manage synchronization information including link identifiers of the first to fourth access links of the first communication device and the second communication device, link state information indicating that the first to fourth access links are normal or in failure, and path state information indicating that the first and second paths configuring a communication path between the third device and the first or second device with paired with the first to fourth access links are normal or in failure, through the synchronization information communication path, in synchronization, and the first communication device and the second communication device control switching of the first to fourth access links of the first network, and switching of the first and second paths of the second network on the basis of the synchronized information to switch the communication path between the third device and the first or second device to another.

According to the second solving means of the present invention, there is provided a path switching method in a communication system comprising:

a first communication device that is arranged between a first network and a second network, communicates with a first device of the first network through a first access link, communicates with a second device, which is made redundant with the first device, of the first network through a second access link, and communicates with a third device of the second network through a first path; and a second communication device that is arranged between the first network and the second network, communicates with a first device of the first network through a third access link, communicates with the second device of the first network through a fourth access link, and communicates with the third device of the second network through a second path, wherein the first communication device and the second communication device each manage synchronization information including link identifiers of the first to fourth access links of the first communication device and the second communication device, link state information indicating that the first to fourth access links are normal or in failure, and path state information indicating that the first and second paths are normal or in failure, in synchronization between the first communication device and the second communication device, and the first communication device and the second communication device control switching of the first to fourth access links of the first network, and switching of the first and second paths of the second network on the basis of the synchronized information to switch the communication path between the third device and the first or second device to another.

According to the third solving means of the present invention, there is provided a communication device used as a first or second communication device in a communication system comprising:

the first communication device that is arranged between a first network and a second network, communicates with a first device of the first network through a first access link, communicates with a second device, which is made redundant with the first device, of the first network through a second access link, and communicates with a third device of the second network through a first path; and the second communication device that is arranged between the first network and the second network, communicates with a first device of the first network through a third access link, communicates with the second device of the first network through a fourth access link, and communicates with the third device of the second network through a second path, the communication device comprising:

a database that stores synchronization information including link identifiers of the first to fourth access links of the first communication device and the second communication device, link state information indicating that the first to fourth access links are normal or in failure, and path state information indicating that the first and second paths are normal or in failure, and a communication path control unit that manages the synchronization information in synchronization with the first communication device or the second communication device which is paired, and controls switching of the first to fourth access links of the first network, and switching of the first and second paths of the second network on the basis of the synchronized information to switch the communication path between the third device and the first or second device to another.

It is possible, according to the present invention, to provide a communication system, a path switching method, and a communication device in which a path in a first network, a path in a second network, and a communication device between the first network and the second network can be made redundant, and a redundant communication device switches a path extending between the first network and the second network to another.

BRIEF DESCRIPTION OF THE DRAWINGS

FIG. 3 is a diagram illustrating an example of a redundancy group management database of the transport edge node according to the embodiment of the present invention;

FIG. 4 is a diagram illustrating an example of a link state management database of the transport edge node according to the embodiment of the present invention;

FIG. 5 is a diagram illustrating an example of an LSP management database of the transport edge node according to the embodiment of the present invention;

FIG. 8B is a flowchart illustrating an example of the link failure detection of the transport edge node according to the embodiment of the present invention (2/2);

FIG. 9 is a flowchart illustrating an example of an LSP failure detection of the transport edge node according to the embodiment of the present invention;

FIG. 15 is a diagram illustrating an example of an LSP management database of the transport edge node according to the second embodiment of the present invention;

FIG. 16 is a diagram illustrating an example of a redundant LSP management database of the transport edge node according to the second embodiment of the present invention;

FIG. 18 is a flowchart illustrating an example of an LSP failure detection of the transport edge node according to the second embodiment of the present invention;

DETAILED DESCRIPTION OF THE INVENTION

First Embodiment

Hereinafter, a first embodiment of the present invention will be described in detail with reference to the accompanying drawings. In this embodiment, an example in which a multi-protocol label switching-transport profile (MPLS-TP) is used for a communication protocol of a packet transport NW will be described. However, other communication protocols are applicable, and the same effects are obtained without depending on the communication protocol of a packet transport network. Also, an example in which the Ethernet is used for the access link, and a link aggregation is used for redundancy of an Ethernet access link will be described. An appropriate communication protocol that can make the access links redundant is used as the access links with the same effects.

Figure 1:
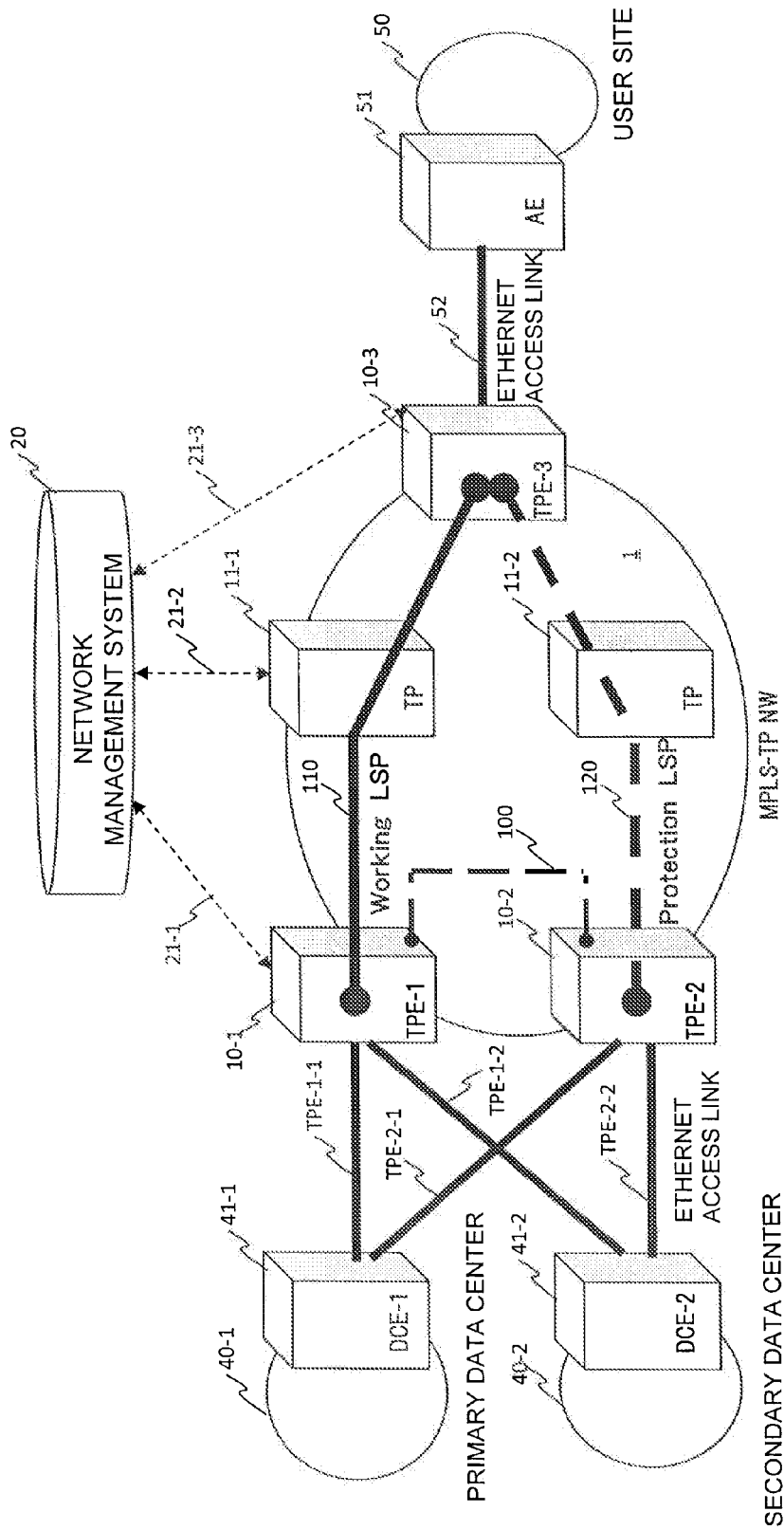
FIG. 1 is a diagram illustrating an example of a transport system according to an embodiment of the present invention.

FIG. 1 is a diagram illustrating an example of a packet transport system in which a primary data center 40-1, a secondary data center 40-2, and a user site 50 are connected to a packet transport network (hereinafter referred to as "MPLS-TP NW") 1 by an Ethernet access link to provide redundant paths between the user site 50 and the primary data center 40-1, and between the user site 50 and the secondary data center 40-2.

In a state where no failure occurs in this transport system, the user site 50 is connected to the primary data center 40-1, and a user uses an IT service using a resource within a data center.

The packet transport system includes transport edge nodes (hereinafter referred to as "TPE nodes") 10-n, transport nodes (hereinafter referred to as "TP nodes") 11-n, and a network management system (hereinafter referred to as "NMS") 20.

The TPE nodes (first communication device, second communication device) 10-n are arranged on an edge of the MPLS-TP NW 1, and has an Ethernet access link holding interface (IF), an MPLS-TP NW connection IF, and a network management system connection IF. The TPE nodes 10-n each hold the Ethernet access link, and have a function of allocating an LSP label for transferring data received from the Ethernet access link through a label switched path (LSP). Also, in this embodiment, the TPE nodes 10-n each have a maintenance management function of the LSP, a redundant function of the LSP, and a redundant function of the Ethernet access link. One TPE node 10-n connected to the data center has a state synchronization function that exchanges the Ethernet access link holding interface and a state (normal/failure) of the LSP with another TPE node 10-n physically different from the one TPE node 10-n for synchronization. A confounding LSP (synchronization information communication path) 100 is used for a communication of data for exchanging the state. The detail of the TPE node 10-n will be described later.

The TP nodes 11-n are arranged within the MPLS-TP NW 1, and has the MPLS-TP NW connection IF and the network management system connection IF. The TP nodes 11-n each have a function of transferring communication data to a subsequent TP node or TPE node on the basis of the LSP label when receiving an LSP labeled communication data from the TPE nodes 10-n or another TP node 11-n.

The NMS 20 is connected to the TPE nodes 10-n and the TP nodes 11-n through communication path 21, and conducts a variety of setting such as path setting of the LSP on the respective nodes.

Data centers 40-n each have a data center edge node (first device, second device; hereinafter referred to as "DCE node") 41-n, a server (not shown), and a storage (not shown). The DCE nodes 41-n are each arranged on an edge of the data center, and connected to an MPLS-TP NW (for example, TPE node) through the Ethernet access link.

The user site 50 has an access edge node (third device; hereinafter referred to as "AE node") 51, a local area network (LAN) switch (not shown), and a user terminal (not shown). The AE node 51 is arranged on a user site edge, and connected to the MPLS-TP NW (for example, TPE node) through the Ethernet access link.

In this embodiment, in order to realize a redundancy of the data centers 40-n and a redundancy of the communication paths between the user site 50 and the data centers 40-n, a data center edge node 1 (hereinafter referred to as "DCE-1 node") 41-1 of the primary data center 40-1 is connected to a transport edge node 1 (TPE-1 node) 10-1 and a transport edge node 2 (TPE-2 node) 10-2 through Ethernet access links TPE-1-1 and TPE-2-1, respectively. A data center edge node 2 (hereinafter referred to as "DCE-2 node") 41-2 of the secondary data center 40-2 is connected to the TPE-1 node 10-1 and the TPE-2 node 10-2 through Ethernet access links TPE-1-2 and TPE-2-2, respectively. Also, the TPE-1 node 10-1 and a TPE-3 node 10-3 are connected to each other by an LSP path 110, and the TPE-2 node 10-2 and the TPE-3 node 10-3 are connected to each other by an LSP path 120.

With those connection configurations, even after a failure of the Ethernet access links TPE-1-1, TPE-1-2, TPE-2-1, and TPE-2-2, a failure of the TPE-1 node 10-1 and the TPE-2 node 10-2, and a failure of the packet transport paths 110 and 120 occur, a communication path between the user site 50 and the primary data center 40-1 can be maintained. Therefore, the data center (access destination) accessed from the user site is maintained.

In this example, just in a configuration where the Ethernet access links between the DCE-1 nodes 41-1, the DCE-2 node 41-2, and the TPE-1 node 10-1, the TPE-2 node 10-2 are set in a cross fashion, and the working LSP path 110 and the protection LSP path 120 are set between the TPE-1 node 10-1, the TPE-3 node 10-3, and the TPE-2 node 10-2, the TPE-3 node 10-3, the redundant path cannot be provided so that the data center accessed from the user site is maintained if the above failures occur. A mechanism for maintaining the data center accessed from the user site even if the above failures occur will be described below.

Also, there can be provided the communication path between the user site and the data center even if the failures occur by switching the data center accessed from the user site to another when a failure of the DCE-1 node 41-1 occurs.

Subsequently, a configuration of the TPE nodes 10-n and the switching operation when the failure occurs will be described with reference to FIGS. 2 to 12.

Figure 2:
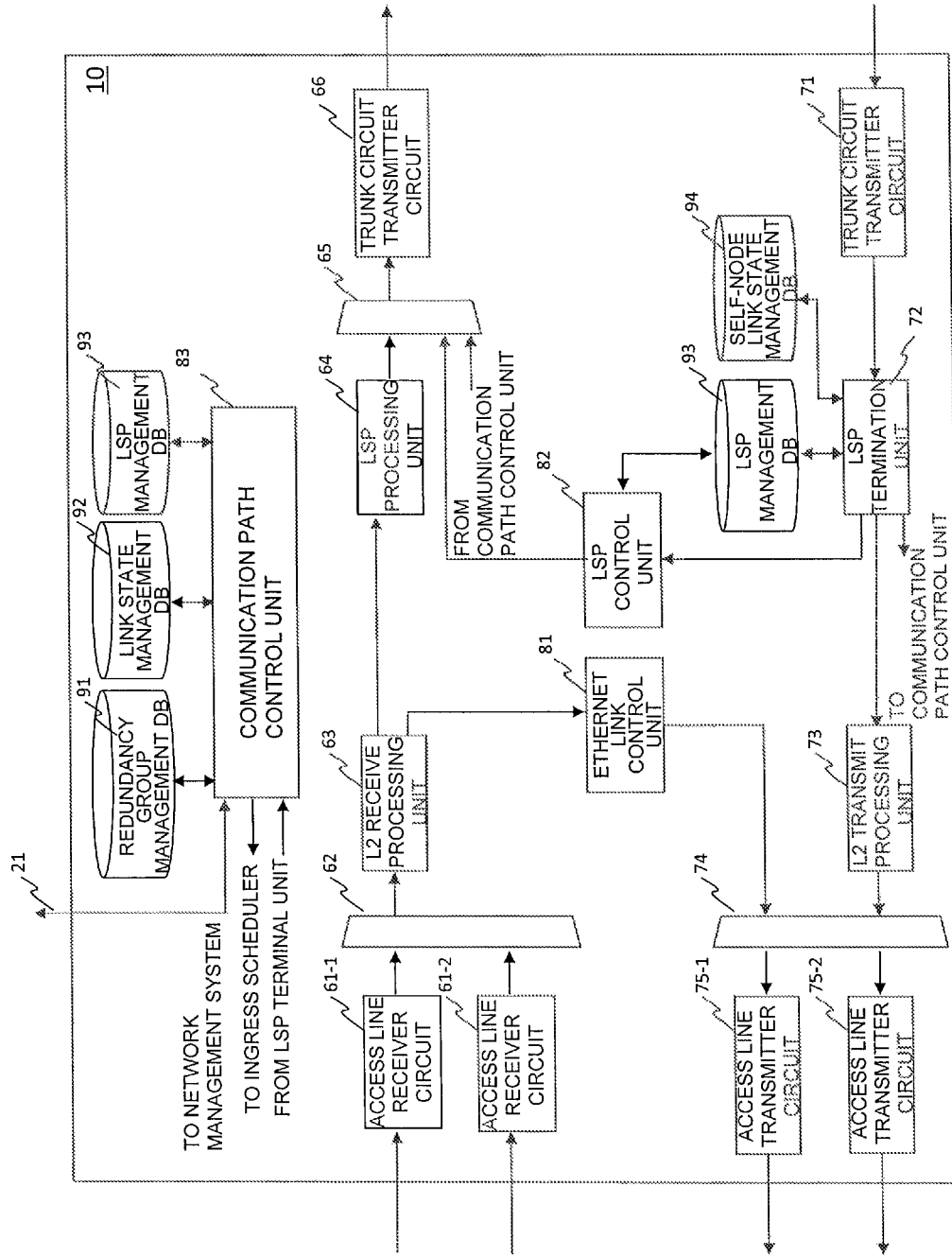
FIG. 2 is a block diagram of an example of a transport edge node according to the embodiment of the present invention.

FIG. 2 is a configuration diagram of the TPE nodes 10-*n* according to this embodiment. Each of the TPE nodes 10-*n* includes one or more access line receiver circuits 61-*n*, a scheduler 62, an L2 receive processing unit 63, an LSP processing unit 64, a scheduler 65, and at least one trunk circuit transmitter circuit 66. The TPE node 10-*n* also includes at least one trunk circuit receiver circuit 71, an LSP termination unit 72, an L2 transmit processing unit 73, a scheduler 74, one or more access line transmitter circuits 75-*n*, an Ethernet link control unit (link control unit) 81, an LSP control unit (path control unit) 82, and a communication path control unit 83.

The access line receiver circuits 61-*n* are connected to the Ethernet access link (not shown), and has a function of receiving communication data from the DCE node 41-*n* or the AE node 51. The access line receiver circuits 61-*n* transfer the received communication data to the scheduler 62. The access line receiver circuits 61-*n* are paired with the access line transmitter circuits 75-*n*, and connected to the same Ethernet access link IF.

The scheduler 62 conducts mediation for transferring the communication data received by the plurality of access line receiver circuits 61-*n* to the L2 receive processing unit 63.

The L2 receive processing unit 63 terminates a protocol of a data link layer of an open systems interconnection (OSI) reference model of the communication data received from the Ethernet access link (executes termination processing of an Ethernet packet in an L2 receive processing unit 42 when the data link layer protocol is, for example, the Ethernet). Also, the L2 receive processing unit 63 has a function of transferring a control packet used for switching control of the Ethernet access line in the received communication data to the Ethernet link control unit 81, and transferring the other data packets to the LSP processing unit 64.

The LSP processing unit 64 has a route information database (not shown), and determines a transmit LSP which is a communication path, through which the data packet is to be transferred, according to destination information (for example, destination address of a MAC header, or a Virtual LAN identifier (VID) information of a Virtual LAN (VLAN) tag) of the received communication data. Further, the LSP processing unit 64 generates an MPLS label according to the determined LSP, capsulates the data packet in an MPLS-TP format, and transfers the data packet to the scheduler 65 as an MPLS packet.

The scheduler 65 conducts output mediation among the LSP processing unit 64, the LSP control unit 82, and the communication path control unit 83, and transfers the received communication data to the trunk circuit transmitter circuit 66. The trunk circuit transmitter circuit 66 transmits the MPLS packet received from the scheduler 65 to the MPLS-TP NW1.

The trunk circuit receiver circuit 71 is connected to the MPLS-TP NW connection IF (not shown), and has a function of receiving the MPLS packet received from the MPLS-TP NW. The trunk circuit receiver circuit 71 transfers the received MPLS packet to the LSP termination unit 72.

The LSP termination unit 72 analyzes the MPLS packets received from the trunk circuit receiver circuit 71, and classifies the MPLS packets into OAM packets and data packets according to the analysis result. If the received MPLS packet is the OAM packet, the LSP termination unit 72 transfers the received packet to the LSP control unit 82. If the received MPLS packet is the data packet, the LSP termination unit 72 acquires the MPLS label from the MPLS packet, and searches the an LSP management data database (DB) 93 and a self-node link state management DB 94 from an LSP identifier (ID) of the acquired MPLS label. The LSP termination unit 72 determines discard processing or transfer processing of the received MPLS packet on the basis of a result of searching the LSP management DB 93 and the self-node link state management DB 94.

The LSP management DB 93 will be described with reference to FIG. 5. The LSP management DB 93 includes an LSP ID 221, a link ID 222 that designates the Ethernet access link to which the LSP belongs, an LSP state 223 that holds a state (normal/abnormal) of the MPLS path, an operating state 224 that holds an operating state (operating state (ACT) or nonoperating state (SBY) when the LSP is redundant) of the LSP, and a paired LSP ID (LSP ID paired when the LSP is redundant) 225.

Arbitrary values are set for the LSP ID 221, the link ID 222, and the paired LSP ID 225 by the NMS 20. Also, the LSP state is set by the LSP control unit 82 as to whether the LSP is normal or in failure after a normality confirmation of each LSP starts by the OAM, after the LSP is set within the MPLS-TP NW1 by the NMS 20. ACT/SBY is set for the operating state 224 by the NMS 20 as a default value, also taking the operating state of the paired LSP into account (the subject LSP is SBY if the paired LSP is ACT). When the LSP is used without being made redundant, ACT is set for the operating state.

Figure 6:
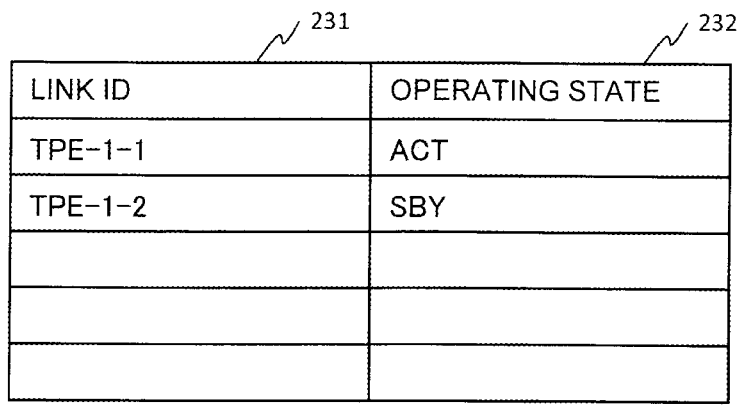
FIG. 6 is a diagram illustrating an example of a self-node link state management database of the transport edge node according to the embodiment of the present invention.

The self-node link state management DB 94 will be described with reference to FIG. 6. They subject node management DB 94 includes a link ID 231 that holds the identifier information of the Ethernet link provided in the subject TPE node, and an operating state 232 (operating state (ACT) or nonoperating state (SBY) when the Ethernet link is redundant) of the link.

The link ID 231 is set by the NMS 20. The ACT/SBY is set for the operating state 232 by the NMS 20, taking a state of the Ethernet link belonging to the same redundancy group as a default value into account. When the Ethernet link is used without being made redundant, the ACT is set for the operating state.

The operation when the LSP termination unit 72 receives the data packet from the trunk circuit receiver circuit 71 will be described. The LSP termination unit 72 acquires the LSP ID from an LSP label of the data packet upon receiving the data packet, and searches the LSP management DB 93. The LSP termination unit 72 acquires the link ID 222 corresponding to the LSP ID, and the operating state 224 of the LSP from the LSP management DB 93. Then, the LSP termination unit 72 searches the self-node link state management DB 94 from the link ID 222, and acquires the operating state 232 of the link.

If the operating state 224 of the LSP acquired from the LSP management DB 93 is ACT, and the operating state 232 of the link acquired from the self-node link state management DB is also ACT, the LSP termination unit 72 deletes the LSP label from the data packet, and transfers the data packet to the L2 transmit processing unit 73. As a result, the packet of the ACT system is transferred.

On the other hand, if any one of the operating state 224 of the LSP acquired from the LSP management DB 93 and the operating state 232 of the link acquired from the self-node link state management DB is SBY, the LSP termination unit 72 discards the data packet. With the above operation, erroneous transmission of the data packet to the Ethernet link of SBY can be prevented, and data packet erroneous transmission of the data packet received from the LSP of SBY to the ACT Ethernet link can be prevented. For example, when the data packet is transmitted from the Ethernet link of SBY, or the data packet received from the LSP of SBY is transmitted to the ACT Ethernet link, the data packets can be prevented from being redundantly transferred to the Ethernet link.

Upon receiving the data packet from the LSP termination unit 72, the L2 transmit processing unit 73 implements the protocol processing on the data link layer of the OSI reference model of the received communication data, and transfers the data packet to the scheduler 74.

The scheduler 74 has a function of conducting frame output mediation between the Ethernet link control unit 81 and the L2 transmit processing unit 73, and a function of transferring the received frame to a designated access line transmitter circuit 75-1.

The access line transmitter circuits 75-*n* are connected to the Ethernet access link IF (not shown), and has a function of transmitting the communication data to the DCE node 41-*n* or the AE node 51. The access line transmitter circuits 75-*n* are paired with the access line receiver circuits 61-*n*, and connected to the same Ethernet access link IF.

The Ethernet link control unit 81 is connected to the L2 receive processing unit 63 and the scheduler 74, and has a function of generating and terminating the control packet for the redundancy (ACT/SBY) control of the Ethernet access link line and the redundancy of the Ethernet access link line.

For example, a link aggregation using a link aggregation control protocol (LACP) can be used for the redundancy of the Ethernet access link line. In the link aggregation using the LACP, the control packet called "LACP data unit" (LACPDU) is periodically exchanged to the Ethernet link which is to use the link aggregation between the self-node and a counter node connected thereto by the Ethernet link. The LACPDU has a field for giving notice of a status of the self-node and a status of the counter node. With the use of this field, the link (ACT) using the Ethernet access link line as the link aggregation, and the link (SBY) using no Ethernet access link line can be controlled. In the present specification, the LACPDU is called "control packet", the control packet for setting the Ethernet access link line as ACT is called "ACT control packet", and the control packet for setting the Ethernet access link line as SBY is called "SBY control packet".

The Ethernet link control unit 81 generates and transmits the ACT control packet and the SBY control packet according to an ACT/SBY instruction of the Ethernet access link line from the communication path control unit 83. Also, the Ethernet link control unit 81 analyzes the control packet received from the counter node, sets the Ethernet link as ACT if the self-node transmits the ACT control packet, and receives the ACT control packet from the counter device, and sets the Ethernet link as SBY if the control packet of SBY is transmitted or received from the self-node or the counter device. Then, the Ethernet link control unit 81 notifies the communication path control unit 83 of those Ethernet links.

The LSP control unit 82 is connected to the LSP termination unit 72 and the scheduler 65, and has a function of generating and terminating the MPLS OAM packet for confirming the normality of the respective LSPs set in the MPLS-TP NW1, and a redundancy (ACT/SBY) control function of the LSP.

The MPLS OAM has a function of periodically transmitting and receiving a continuity check (CC) packet to confirm the normality of the LSP, a function of allowing the node that detects the LSP failure to transmit a link down indication (LDI) packet to the termination node of the LSP to detect the failure by the termination node, and a function of executing the ACT/SBY control of the redundant LSP.

The LSP control unit 82 confirms the normality of a working LSP (operating system path) and a protection LSP (non-operating path) upon transmission and reception of the CC packet, and can detect the failure of the LSP upon detection of non-reception of the CC packet or the LDI packet reception from the relay TP node.

Also, when the LSP that detects the failure is the LSP of ACT, the LSP control unit 82 transmits a packet switch cable (PSC) packet that executes the path switching to conduct the ACT/SBY control of the LSP within the MPLS-TP NW.

Further, the PSC that is standardized by an Internet engineering task force (IETF) transmits and receives the PSC packet by the protection LSP to implement ACT/SBY switching. In this case, it is presupposed that two LSPs of ACT and SBY are terminated by the same transport edge node. In this embodiment, as illustrated in FIG. 1, in the operation where the working LSP 110 is terminated by the TPE-1 node 10-1, and the protection LSP path 120 is terminated by the TPE-2, the ACT/SBY of the LSP cannot be controlled just in transmitting and receiving the PSC packet by the protection LSP. Under the circumstances, the LSP control unit of this embodiment transmits and receives the switching control packet by the working LSP or the protection LSP to switch the ACT/SBY of the LSP to another.

Referring to FIG. 1, when the working LSP 110 operates as ACT, and the protection LSP 120 operates as SBY, and ACT/SBY of the LSPs are switched to the others, there are, for example, a switching method by a TPE-1 node 10-1 trigger, a switching method by a TPE-2 node 10-2 trigger, and a switching method by a TPE-3 node 10-3 trigger.

First, the switching method by the TPE-1 node 10-1 trigger will be described. When the TPE-1 node 10-1 sets the working LSP to SBY due to some factor (for example, a predetermined condition is met), the TPE-1 node 10-1 transmits the SBY control packet to the working LSP 110. Also, the TPE-1 node 10-1 changes the operating state of the working LSP 110 in the LSP management database 93 to SBY. The TPE-3 node 10-3 that has received the SBY control packet specifies the protection LSP 120 paired with the working LSP 110 according to the database provided within the device, and transmits the ACT control packet to the protection LSP 120. Also, the TPE-3 node 10-3 sets the working LSP 110 to SBY, and the protection LSP 120 to ACT in the operating state of the LSP management DB 93. The TPE-2 node 10-2 that has received the ACT control packet changes the operating state of the LSP management DB 93 to ACT. As a result, the ACT/SBY switching of the working LSP and the protection LSP can be realized.

The switching method by the TPE-2 node 10-2 trigger will be described. When the TPE-2 node 10-2 sets the protection LSP to ACT due to some factor (for example, a predetermined condition is met), the TPE-2 node 10-2 transmits the ACT control packet to the protection LSP 120. Also, the TPE-2 node 10-2 changes the operating state of the LSP 120 in the LSP management database 93 to ACT. The TPE-3 node 10-3 that has received the ACT control packet specifies the working LSP 110 paired with the protection LSP 120 according to the database provided within the device, and transmits the SBY control packet to the working LSP 110. Also, the TPE-3 node 10-3 sets the working LSP 110 to SBY, and the protection LSP 120 to ACT in the operating state of the LSP management DB 93. The TPE-1 node 10-1 that has received the SBY control packet changes the operating state of the LSP 110 in the LSP management DB 93 to SBY. As a result, the ACT/SBY switching of the working LSP and the protection LSP can be realized.

The switching method by the TPE-3 node 10-3 trigger will be described. When the TPE-3 node 10-3 sets the working LSP 110 to SBY, and sets the protection LSP 120 to ACT due to some factor (for example, a predetermined condition is met), the TPE-3 node 10-3 transmits the SBY control packet to the working LSP 110, and transmits the ACT control packet to the protection LSP 120. Also, the TPE-3 node 10-3 changes the working LSP 110 to SBY, and the protection LSP 120 to ACT in the operating state of the LSP management DB 93. The TPE-1 node 10-1 that has received the SBY control packet changes the operating state of the LSP 110 in the LSP management DB 93 to SBY. Further, the TPE-2 node 10-2 that has received the ACT control packet changes the operating state of the LSP 120 in the LSP management DB 93 to ACT. As a result, the ACT/SBY switching of the working LSP and the protection LSP can be realized.

The communication path control unit 83 has a network management system connection IF with the network management system 20, and the setting information from the network management system 20 is reflected by a database provided in the transport edge node. Also, the communication path control unit 83 is connected to the scheduler 65 and the LSP termination unit 72.

Upon receiving an ACT/SBY switching request of the Ethernet access link line from the network management system 20, or an ACT/SBY switching request of the LSP, the communication path control unit 83 notifies the Ethernet link control unit 81 and the LSP control unit 82 of the switching requests. Further, the communication path control unit 83 has a function of implementing the ACT/SBY switching of the Ethernet access link line and the LSP so that a communication between the user site 50 and the data centers 40-$n$ has no trouble, with a detection of the failure of the Ethernet access link line that connects the data centers 40-$n$ and the user site, the failure of LSP, and the failure of the confounding LSP as a trigger. In order to realize the ACT/SBY switching when those failures occur, the communication path control unit 83 has a redundancy group management DB 91, a link state management GB 92, and the LSP management DB 93. The LSP management DB 93 can be shared by the LSP termination unit 72 and the LSP control unit 82. The respective DBs of the TPE nodes 10-$n$ are not limited to the configuration in this embodiment, but may be appropriately configured, or configured by an appropriately integrated database.

The redundancy group management DB 91 will be described with reference to FIG. 3. The redundancy group management DB 91 includes a redundancy group ID 201 which is identifiers of redundancy groups, and a primary link 1 202 and a primary link 2 203 which retain the identifiers of the Ethernet access links connected with the primary data center. The redundancy group management DB 91 also includes a second link 1 204 and a secondary link 2 205 which retain the identifiers of the Ethernet access links connected with the secondary data center, a confounding LSP ID 206, and a confounding LSP state 207 that manages whether the confounding LSP is normal or in failure.

Information on the redundancy group ID 201, the primary link 1 202, the primary link 2 203, the secondary link 1 204, the secondary link 2 205, and the confounding LSP ID 206 in the redundancy group management DB 91 are set by the network management system 20.

The link state management DB 92 will be described with reference to FIG. 4. The link state management DB 92 includes a link ID 211 of the Ethernet access link provided in the TPE nodes 10-$n$ and the Ethernet access link belonging to the same redundancy group ID 201, a belonging redundancy group ID 212, a redundancy priority 213 that retains the priority of the Ethernet link line within the same redundancy group ID, a link state 214 that retains whether the Ethernet access link line operates normally or fails, a held LSP state 215 that retains whether all of the LSPs belonging to the subject link ID operate normally, or partially fail, and an operating state 216 of the Ethernet access link line (whether operating state (ACT) or nonoperating state (SBY)).

The redundancy priority 213 that retains the order of priority for using the normal Ethernet access links as ACT can set, for example, the Ethernet access link TPE-1-1 connected to the primary data center 40-1 of the TPE-1 node 10-1 that holds the working LSP 110 as "1" which is the first priority. The redundancy priority 213 sets the Ethernet access link TPE-2-1 connected to the primary data center 40-1 of the TPE-2 node 10-2 that holds the protection LSP 120 as "2" which is the second priority. The redundancy priority 213 sets the Ethernet access link connected to the secondary data center 40-2 of the TPE-1 node 10-1 that holds the working LSP 110 as "3" which is the third priority. The redundancy priority 213 sets the Ethernet access link connected to the secondary data center 40-2 of the TPE-2 node 10-2 that holds the protection LSP 120 as "4" which is the fourth priority.

When the order of priority is thus set, the redundant path can be provided so that the data center accessed from the user site even when the failure occurs is maintained by, for example, the data center 40-1. The detailed operation for maintaining the data center accessed from the user site even after the failure occurs will be described later.

The operating state 216 of the link state management DB 92 is always synchronized with the operating state 232 of the self-node link state management DB 94.

The redundancy group management DB 91 and the link state management DB 92 in FIGS. 3 and 4 represent setting values of the TPE-1 node 10-1 and the TPE-2 node 10-2. The redundancy group is not set between those nodes and the other TPE nodes at this time. However, if the redundancy group is set between those nodes and the other TPE nodes, different entries are set in the redundancy group management DB 91 and the link state management DB 92, with which different confounding LSP is set.

The communication path control unit 83 exchanges information (synchronization information) such as the link ID 211, the link state 214, the held LSP state 215, and the operating state 216 of the respective Ethernet access links, which are registered in the link state management DB 92, with another TPE node through the confounding LSP, and synchronizes information of the respective DBs with each other.

Figure 7:
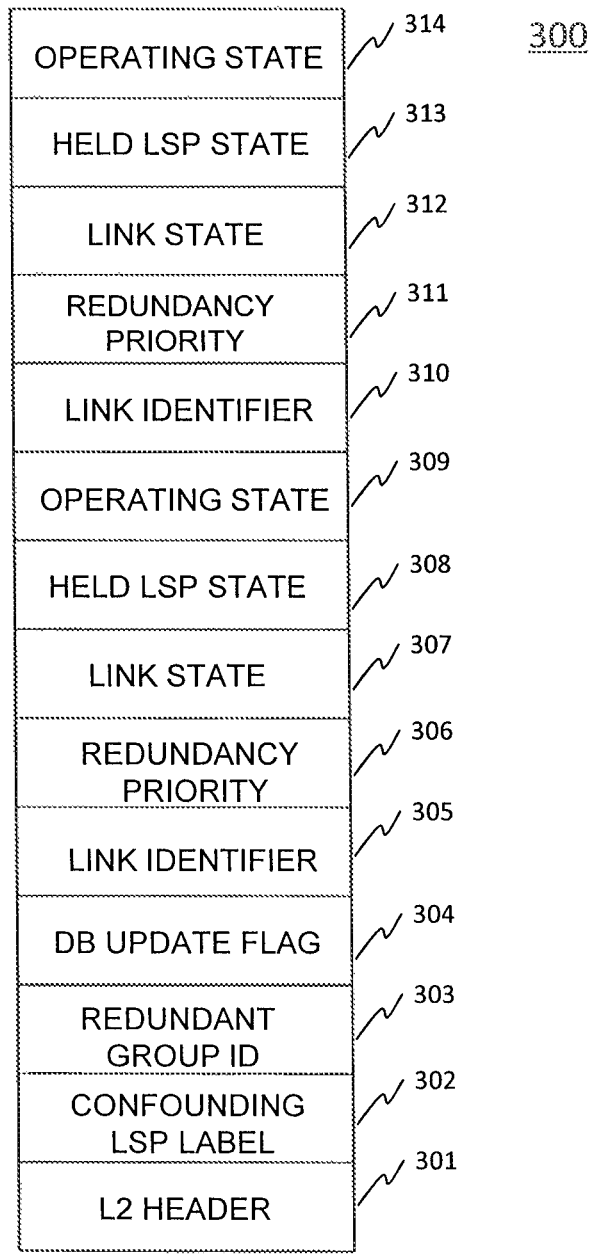
FIG. 7 is a diagram illustrating an example of a DB exchange packet which is exchanged with a confounding LSP by the transport edge node according to the embodiment of the present invention.

FIG. 7 illustrates a data format when the database is exchanged with another by using the confounding LSP. FIG. 7 illustrates an example of a DB exchange packet 300. The DB exchange packet 300 includes an L2 header 301, a confounding LSP label 302, a redundancy group ID 303, a DB update flag 304, a link identifier 305, a redundancy priority 306, a link state 307, a held LSP state 308, an operating state 309, a link identifier 310, a redundancy priority 311, a link state 312, a held LSP state 313, and an operating state 314. The reason why the respective fields of the link identifier, the redundancy priority, the link state, the received LSP state, and the operating state are provided two by two is that two Ethernet access links are provided for each TPE node for the purpose of making the access line redundant.

The transmission moment of the DB exchange packet 300 in the communication path control unit 83 has, for example, two moments of (1) regular transmission and (2) state update transmission.

In the regular transmission, the DB exchange packets are regularly (for example, one-second cycle) transmitted and received between two TPE nodes. In this situation, information representing "without updated information" is inserted into the DB update flag 304 field of the DB exchange packets, and transmitted. As a result, the communication path control unit 83 regularly exchanges the DB exchange packet 300, thereby being capable of confirming the normality of the confounding LSP. If the communication path control unit 83 detects that the DB exchange packet 300 is not received for a given period or longer, the communication path control unit 83 determines that the confounding LSP is in failure, and determines that a confounding LSP state 207 of the redundancy group management DB 91 is in failure.

With the provision of the DB update flag 304 field, the communication path control unit 83 checks the DB update flag 304 when receiving the DB exchange packet 300, and can determine whether the DB needs to be updated, or not.

In the state update transmission, the communication path control unit 83 transmits the DB exchange packet 300 with the detection (for example, link failure detection or LSP failure detection) of an event that allows the link state management database to be updated as a trigger. In this situation, information representing "with updated information" is inserted into the DB update flag 304 field of the DB exchange packets, and transmitted. As a result, the failure information likely to adversely affect the communication between the user site and the data center can be rapidly shared between the TPE nodes, and a failure switching time can be reduced.

Subsequently, a procedure of switching processing when detecting the failure of the TPE node described above will be described. Failure points likely to occur in the connection confirmation illustrated in FIG. 1 are classified into, for example, the following five patterns.
(1) A failure of the Ethernet access link that connects the DCE-1 node 41-1 or the DCE-2 node 41-2 to the TPE-1 node 10-1 or the TPE-2 node 10-2,
(2) An LSP that connects the TPE-1 node 10-1 or the TPE-2 node 10-2 to the TPE-3 node 10-3,
(3) The TPE-1 node 10-1 or the TPE-2 node 10-2,
(4) The TP nodes 11-n, and
(5) The DCE-1 node 41-1 or the DCE-2 node 41-2.
What alarm can be detected in the TPE-1 node 10-1, the TPE-2 node 10-2, and the TPE-3 node 10-3 to conduct the switching when the above failure occurs will be described in order below.

When the failure of (1) occurs, in the TPE node that holds the failed Ethernet access link, a link down of the Ethernet access link can be detected to determine that the link is in failure.

When the failure of (2) occurs, in the TPE node that holds the failed LSP, it can be determined that the LSP is in failure when the CC packet is not detected in the LSP.

When the failure of (3) occurs, in the TPE-1 node or the TPE-2 node, it can be determined that the TPE-1 node or the TPE-2 node is in failure upon non-reception of the DB exchange packet 300, and reception of the ACT control packet from the LSP connected with the TPE-3 node.

When the failure of (4) occurs, it can be detected that the LSP is in failure when the LDI packet is received from the LSP through the failed TP node, or the non-reception of the CC packet is detected. When the failure of the TP node occurs, it is difficult that the TPE node specifies which of the TP node failure and the LSP failure occurs. However, with the detection as the LSP failure, it can be detected there is a possibility that a failure which creates any problem in the communication occurs.

When the failure of (5) occurs, it can be detected that the Ethernet access link is subjected to link-down in the TPE node connected with the failed DCE node. When the failure of the DCE node occurs, it is difficult that the TPE node specifies which of the DCE node failure and the Ethernet access link failure occurs. However, with the detection of the Ethernet access link failure, it can be detected there is a possibility that a failure which creates any problem in the communication occurs.

When the failure information that can be detected by the above failure points is organized, the failure information is configured by any one or the combination of the Ethernet access link failure, the LSP failure, and the confounding LSP failure.

Hereinafter, the operation of the TPE node when the Ethernet link failure, the LSP failure, or the confounding LSP failure occurs will be described with reference to flowcharts of FIGS. 8 to 12.

First, the operation of the TPE node when detecting the Ethernet access link failure will be described with reference to FIGS. 8A and 8B.

Upon detection of the Ethernet access link failure, the communication path control unit 83 updates the link state 214 of the link ID 211 in which the failure of the link state management DB 92 occurs as the failure. Also, the communication path control unit 83 acquires the belonging redundancy group ID 212 and the operating state 216 from the link state management DB 92 (S101).

The communication path control unit 83 searches the redundancy group management DB 91 on the basis of the belonging redundancy group ID 212, and acquires the corresponding confounding LSP ID 206 (S102). The confounding LSP ID is a confounding LSP ID used for replacement of the database by the redundancy group.

Then, the communication path control unit 83 exchanges "redundancy priority", "link state", "held LSP state", and "operating state" of the link ID belonging to the belonging redundancy group whose database has been updated, between the TPE-1 node 10-1 and the TPE-2 node 10-2 through the confounding LSP 100. For example, the communication path control unit 83 transmits "redundancy priority", "link state", "held LSP state", and "operating state" of each entry of the same belonging group ID as the belonging redundancy group ID 212 acquired in Step S101 to another TPE node through the confounding LSP 100. The TPE node updates the redundancy priority and the above respective states of each link ID obtained from another TPE belonging to the same belonging redundancy group for each database (S103).

Subsequently, the TPE-1 node 10-1 and the TPE-2 node 10-2 (for example, communication path control unit 83) exchange the respective DBs with each other, thereafter again search the link state management DB 92, and determine whether the operating state 216 of the link in which "link state" is in failure is ACT, or not (S104).

If the determination result is "no", that is, the operating state 216 of the Ethernet access link which is determined as the failure is SBY, because the failure does not adversely affect the communication between the user site 50 and the data center 40, the processing is terminated.

On the other hand, if the determination result is "yes", that is, the operating state 216 of the Ethernet access link which is determined as the failure is ACT, because the failure adversely affects the communication between the user site 50 and the data center 40, the communication path control unit 83 determines that the control path is to be switched.

Then, the communication path control unit 83 determines whether a link in which both of the "link state" and "LSP state" are normal is present among the links belonging to the same redundancy group as that of the link in which the failure occurs, or not, with reference to the link state management DB 92 (S105).

If the determination result is "no", that is, all of the communication paths specified by the combination of the links and the LSPs detect any failure, the communication cannot be continued even if the communication path is switched to another. Therefore, the processing is terminated without implementing the switching processing.

If the determination result is "yes", that is, the communication path that does not detect the failure is present, the communication path switching processing is continued.

Subsequently, the communication path control unit 83 sets the operating state 216 of the link in which the failure is detected as SBY, and transmits the SBY control packet for setting the link as SBY from the Ethernet link control unit 81 (S106).

Then, the communication path control unit 83 determines whether both of the "link state" 214 and "held LSP state" 215 of the link belonging to the same redundancy group are normal, and the link second highest in the order of priority is the self-node, or not, with reference to the link state management DB 92 (S107). In the configuration of this example, if only one Ethernet access link is in failure, the node that detects the failure does not have the link second highest in the priority. However, the Ethernet access link failure may occur due to the failure of the DCE node. In this case, the Ethernet access link failure occurs in both of the TPE-1 node 10-1 and the TPE-2 node 10-2. With the application of the determination in S107, this example can deal with the switching at the time of the DCE failure.

If the determination result is "no", that is, both of the "link state" 214 and "held LSP state" 216 of the link belonging to the same redundancy group are normal, and the link second highest in the order of priority is a link connected to another TPE node, there is no need to newly set the link of the self-node to ACT. Therefore, the processing is terminated.

If the determination result is "yes", that is, both of the "link state" 214 and "held LSP state" 216 of the link belonging to the same redundancy group are normal, and the link second highest in the order of priority is a link connected to the self-node, the communication path switching processing is continued.

Then, the communication path control unit 83 transmits the ACT control packet for setting the link second highest in the priority as ACT to the Ethernet access link line. Also, the communication path control unit 83 updates the operating state 216 of the link in the link state management DB 92 to ACT (S108). As a result, the Ethernet access link with the DCE node, which has not been used for the communication as SBY up to now, can be used.

Further, in parallel to S108, the communication path control unit 83 transmits the ACT control packet for setting the LSP to ACT from the LSP control unit 82 to the LSP, if the operating state 224 of the LSP belonging to the link second highest in the priority is SBY, with reference to the LSP management DB 93. However, if the LSP has already been set to ACT, nothing is conducted (S109).

Then, the communication path control unit 83 updates the link state management DB 92 and the LSP management DB 93. For example, the communication path control unit 83 exchanges the "redundancy priority", "link state", "held LSP state", and "operating state" of the link ID belonging to the belonging redundancy group in which the link state management DB 92 is updated through the confounding LSP 100 to others with the use of, for example, the DB exchange packet. In this example, the DB update flag of the DB exchange packet is set to "with updated information". The communication path control unit 83 updates the redundancy priority and the above respective states of each link ID obtained from the TPE node belonging to the same belonging redundancy group for each database (S110).

Through the processing of S101 to S110, the node that detects the Ethernet access link failure can switch the communication path to another as occasion demands.

Then, a processing flow of the TPE node that belongs to the same redundancy group as that of the TPE node which detects the Ethernet access link failure, and does not detect the Ethernet access link failure will be described with reference to FIG. 12. For example, this processing flow corresponds to processing of the TPE-2 node 10-2 when the TPE-1 node 10-1 detects the Ethernet access link failure.

The TPE node that belongs to the same redundancy group as that of the TPE node that has detected the Ethernet access link failure, and does not detect the Ethernet access link failure receives the DB exchange packet in which the DB update flag is indicative of "with updated information" from the confounding LSP 100.

The communication path control unit 83 of the TPE node that has received the DB exchange packet of "with updated information" from the confounding LSP acquires "link identifier", "redundancy priority", "link state", "held LSP state", and "operating state" from a payload, and updates the link state management DB 92 (S501).

Then, the communication path control unit 83 determines whether the corresponding "link state" 214 and "held LSP state" 215 of the link in which the "operating state" 216 of the link ID belonging to the belonging redundancy group which updates the information is ACT are normal, or not, on the basis of the link state management DB 92 (S502).

With the execution of the above determination, the TPE node that has received the DB exchange packet in which the DB update flag 304 is "with updated information" can detect whether the failure that requires the exchange of the communication path occurs, or not.

If the determination result is "no", because the failure does not adversely affect the communication between the user site and the data center, the processing is terminated. For example, this processing corresponds to a case in which the operating state 216 of the Ethernet access link which is in failure is SBY.

If the determination result is "yes", because the failure adversely affects the communication between the user site and the data center, the communication path control unit 83 determines that the control path is to be switched. For example, this processing corresponds to a case in which the operating state 216 of the Ethernet access link which is in failure is ACT.

A sequence when it is determined that the communication path is switched is the same as a flow subsequent to (2) (indicated by a circled number in the figure) in FIG. 8B. As a result, the TPE node belongs to the same redundancy group as that of the TPE node that detects the Ethernet access link failure, and the communication path can be switched to the TPE node that does not detect the Ethernet access link failure.

Figure 8A:
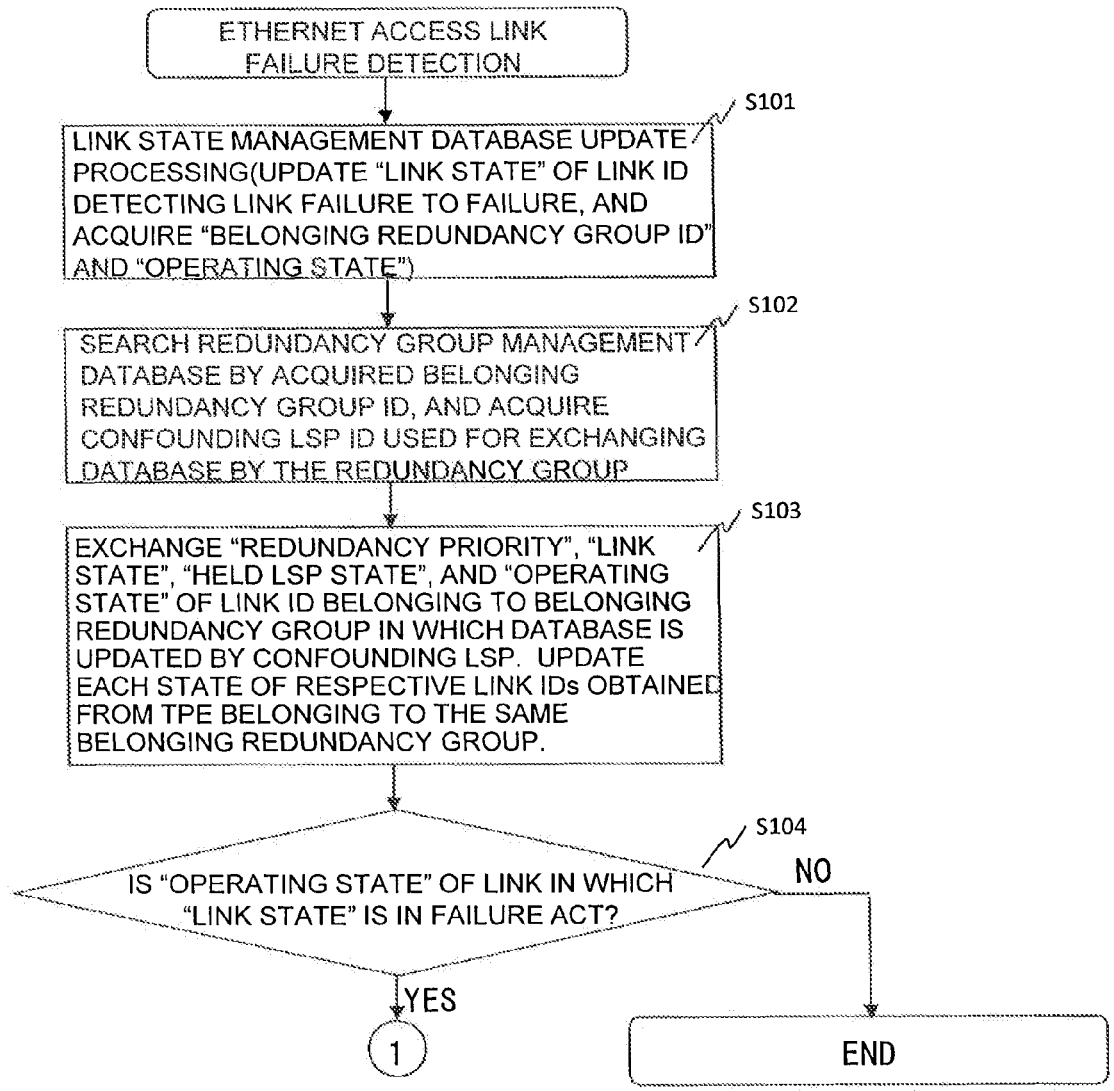
FIG. 8A is a flowchart illustrating an example of a link failure detection of the transport edge node according to the embodiment of the present invention (1/2)
Figure 12:
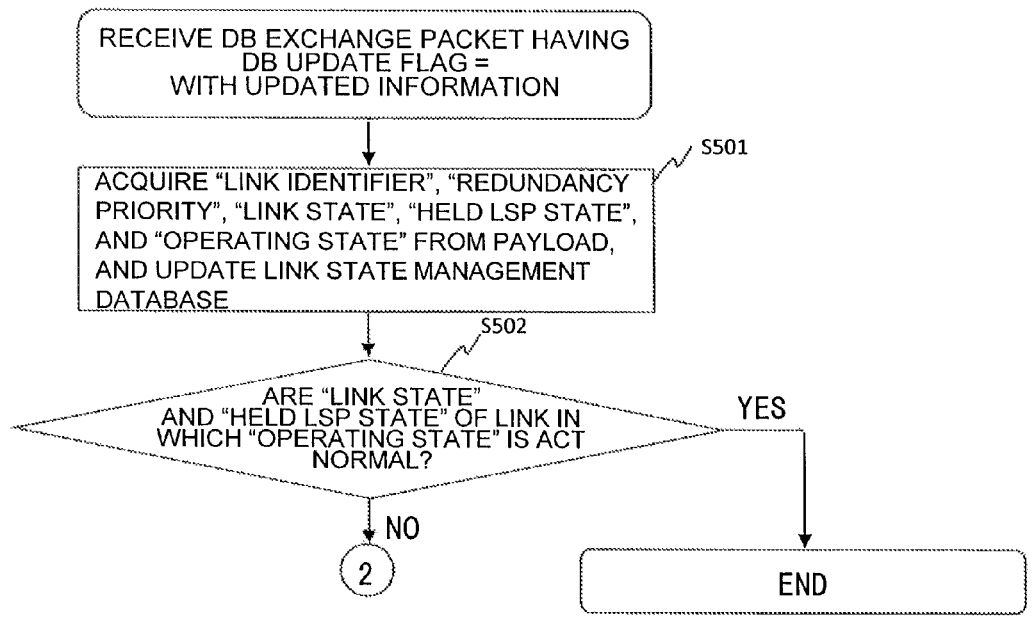
FIG. 12 is a diagram illustrating an example of a case in which the transport edge node receives a DC exchange notification packet in which a DB update flag is indicative of information updated from the confounding LSP according to the embodiment of the present invention.

For example, if the Ethernet access link TPE1-1 in FIG. 1 is in failure, according to the processing flow of FIGS. 8A, 8B, and 12, the communication path between the user site 50 and the primary data center 40-1 is switched from the working LSP 110 and the TPE1-1 to the protection LSP 120 and the TPE2-1. As a result, the communication path between the user site 50 and the primary data center 40-1 is maintained even after the Ethernet access link failure occurs.

Subsequently, the operation of the TPE node when detecting the LSP failure will be described with reference to FIG. 9.

The communication path control unit 83 of the TPE node that detects the LSP failure sets the "LSP state" 223 corresponding to the LSP ID that detects the LSP failure in the LSP management DB 93 as failure, and updates the "operating state" 224 to SBY. Also, the communication path control unit acquires the link ID 222 to which the LSP belongs (corresponding to the LSP ID) (S201).

Then, the communication path control unit 83 searches the link state management DB 92 on the basis of the acquired link ID 222, and updates the corresponding "held LSP state" 215 to failure. Also, the communication path control unit 83 acquires the "belonging redundancy group ID" and "operating state" corresponding to the link ID from the same DB (S202).

The communication path control unit 83 searches the redundancy group management DB 91 on the basis of the belonging redundancy group ID 212, and acquires the corresponding confounding LSP ID 206 (S203). The acquired confounding LSP is a confounding LSP ID used for replacement of the database by the redundancy group.

Then, the communication path control unit 83 exchanges "redundancy priority", "link state", "held LSP state", and "operating state" of the link ID belonging to the belonging redundancy group whose database has been updated, between the TPE-1 node 10-1 and the TPE-2 node 10-2. The communication path control unit 83 updates the redundancy priority and the above respective states of each link ID obtained from another TPE belonging to the same belonging redundancy group for each database (S204).

Subsequently, the TPE-1 node 10-1 and the TPE-2 node 10-2 (for example, communication path control unit 83) exchange the respective DBs with each other, thereafter again search the link state management DB 92, and determine whether the operating state 216 of the link in which "link state" 215 is in failure is ACT, or not (S205).

If the determination result is "no", that is, the operating state 216 of the Ethernet access link which is determined as the LSP failure is SBY, because the failure does not adversely affect the communication between the user site and the data center, the processing is terminated.

If the determination result is "yes", that is, the operating state 216 of the Ethernet access link which is determined as the LSP failure is ACT, because the failure adversely affects the communication between the user site and the data center, the communication path control unit 83 determines that the control path is to be switched.

Then, the communication path control unit 83 determines whether a link in which both of the "link state" 214 and "LSP state" 215 are normal is present among the links belonging to the same redundancy group as that of the LSP in which the failure occurs, or not, with reference to the link state management DB 92 (S206).

If the determination result is "no", that is, all of the communication paths specified by the combination of the links and the LSPs detect any failure, the communication cannot be continued even if the communication path is switched to another. Therefore, the processing is terminated without implementing the switching processing.

If the determination result is "yes", that is, the communication path that does not detect the failure is present, the communication path switching processing is continued.

Subsequently, the communication path control unit 83 sets the "operating state" of the link ID to which the LSP that detects the LSP failure belongs as SBY, and transmits the SBY control packet from the Ethernet link control unit 81 (S207). The link ID to which the LSP belongs is acquired in Step S201.

In the case of the LSP failure, because the communication path between the TPE node that detects the LSP failure and the TPE node that connects the user site disappears, the node in which the Ethernet access link is then made ACT is another TPE node belonging to the same redundancy group. Therefore, the processing is terminated.

The TPE node that does not detect the LSP failure belonging to the same redundancy group receives the DB exchange packet in which the DB update flag is "with updated information" from the confounding LSP, and executes the processing of FIGS. 12 and 8B. As a result, the TPE node belongs to the same redundancy group as that of the TPE node that detects the LSP failure, and the communication path can be switched to the TPE node that does not detect the LSP failure. For example, the ACT control packet in which the LSP of the TPE node is ACT is transmitted to the LSP from the LSP control unit 82 of the TPE node that does not detect the LSP failure (FIG. 8B, S109). The ACT control packet for switching the LSP may be transmitted from the TPE-3 node that detects the failure of the LSP, and the TPE node may receive the ACT control packet, and may make the LSP of the TPE-3 node ACT.

For example, if the working LSP 110 in FIG. 1 is in failure, according to the processing flow of FIGS. 9, 8B, and 12, the communication path between the user site 50 and the primary data center 40-1 is switched from the communication path passing through the working LSP 110 and the TPE1-1 to the communication path passing through the protection LSP 120 and the TPE2-1. As a result, the communication path between the user site 50 and the primary data center 40-1 is maintained even after the LSP failure occurs.

Figure 10:
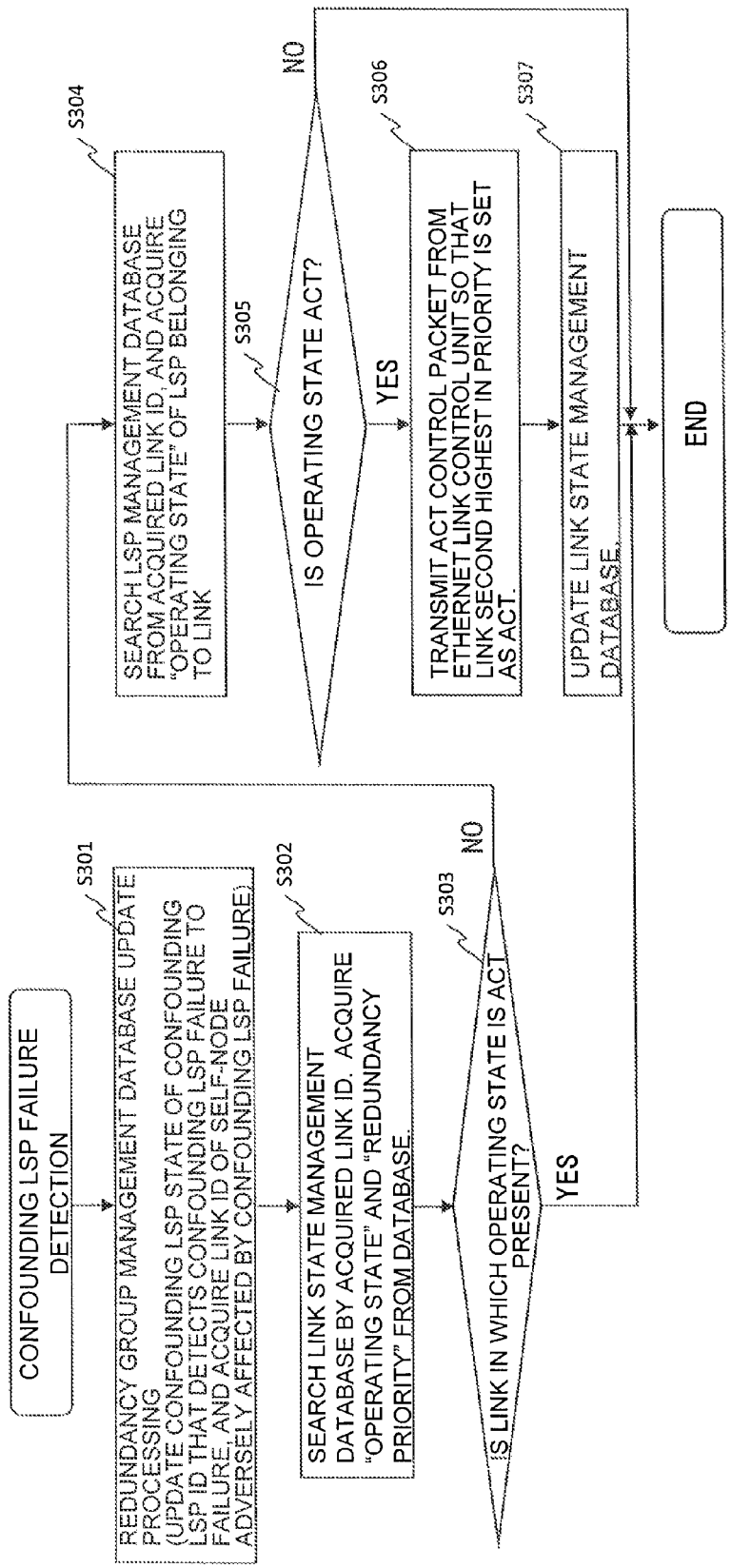
FIG. 10 is a flowchart illustrating an example of a confounding LSP failure detection of the transport edge node according to the embodiment of the present invention.

Subsequently, the operation of the TPE node when detecting the confounding LSP failure will be described with reference to FIG. 10.

The communication path control unit 83 of the TPE node that detects the confounding LSP failure searches the redundancy group management DB 91 on the basis of the confounding LSP ID that detects the failure, and sets the confounding LSP state 207 of an entry to which the confounding LSP ID 206 belongs as failure. Further, the communication path control unit 83 acquires the link ID of the self-node (S301). For example, the confounding LSP ID is further stored in the LSP management DB 93, and the communication path control unit 83 may acquire the corresponding link ID 222 with reference to the LSP management DB 93 on the basis of the confounding LSP ID that detects the failure. Also, a correspondence relationship between the confounding LSP ID and the paired LSP ID is stored in advance, and the communication path control unit 83 may specify the paired LSP ID from the confounding LSP LD that detects the failure, and acquire the link ID 222 corresponding to the paired LSP ID with reference to the LSP management DB 93.

Subsequently, the communication path control unit 83 searches the link state management DB 92 from the acquired link ID 222, and acquires the "redundancy priority" 213 and the "operating state" 216 of the link (S302).

Then, the communication path control unit 83 determines whether ACT is present in the operating states of the link acquired in S302, or not (S303).

With this determination, it can be confirmed whether the self-node operates as the current ACT or operates as the current SBY.

If the determination result is "yes", that is, the Ethernet access link of the self-node has already operated as ACT, the communication between the user site and the data center is not adversely affected by the confounding LSP failure. Therefore, the processing is terminated.

If the determination result is "no", that is, the Ethernet access link connected with the self-node operates as SBY, the data communication between the user site 50 and the data center 40 is executed with the use of another TPE node belonging to the same redundancy group. For example, when it is assumed that the failure of the confounding LSP is detected by the failure of another TPE node, the failure adversely affects the communication between the user site 50 and the data center 40. Therefore, since the communication path switching is necessary, the switching processing is continued.

Then, the communication path control unit 83 searches the LSP management DB 93 on the basis of the acquired link ID, and acquires the operating state 224 of the LSP corresponding to the same link (S304).

Then, the communication path control unit 83 determines whether the operating state 224 of the LSP acquired in S304 is ACT, or not (S305).

If the determination result is "no", that is, the operating state 224 of the LSP is SBY, the TPE-3 node 10-3 of the user site 50 side does not detect the failure of the LSP. In the case where the Ethernet link of the TPE-1 node 10-1 is ACT, and the LSPs of the TPE-1 node 10-1 and the TPE-3 node 10-3 are ACT, if a cause detected as the confounding LSP failure is a failure of the TPE-1 node 10-1, the failure is detected as the LSP failure in the TPE-3 node 10-3, and the ACT control packet for switching the LSP is transmitted from the TPE-3 node 10-3 to the TPE-2 node 10-2 so that the operating state 224 of the LSP management DB 93 has to become ACT. For that reason, when the operating state 224 is SBY, the confounding LSP is merely in failure for some reason, and the TPE node of the Ethernet access link of ACT normally operates. For that reason, the processing is terminated.

If the determination result in S305 is "yes", that is, the operating state 224 of the LSP is ACT, a cause detected as the failure of the confounding LSP is the TPE node failure of the same redundancy group. For that reason, the switching processing is continued.

Subsequently, in order to make the Ethernet access link of the self-node ACT, the communication path control unit 83 transmits the ACT control packet from the Ethernet link control unit 81 to the Ethernet access link according to the acquired redundancy priority 213 (S306). For example, the communication path control unit 83 transmits the ACT control packet to the Ethernet access link higher in the redundancy priority 213 among the Ethernet access links of the self-node. Because the LSP has already become ACT, the data communication is switched to the data communication between the user site 50 and the data center 40 through the self-TPE node.

Finally, the communication path control unit 83 updates the operating state of the link in the link state management DB 92 to ACT (S307).

With the execution of the processing at the time of detecting the confounding LSP failure, the communication path control unit 83 can switch the control packet to another at the time of detecting the confounding LSP failure which is attributable to the TPE node failure having the Ethernet access link of ACT.

Figure 11:
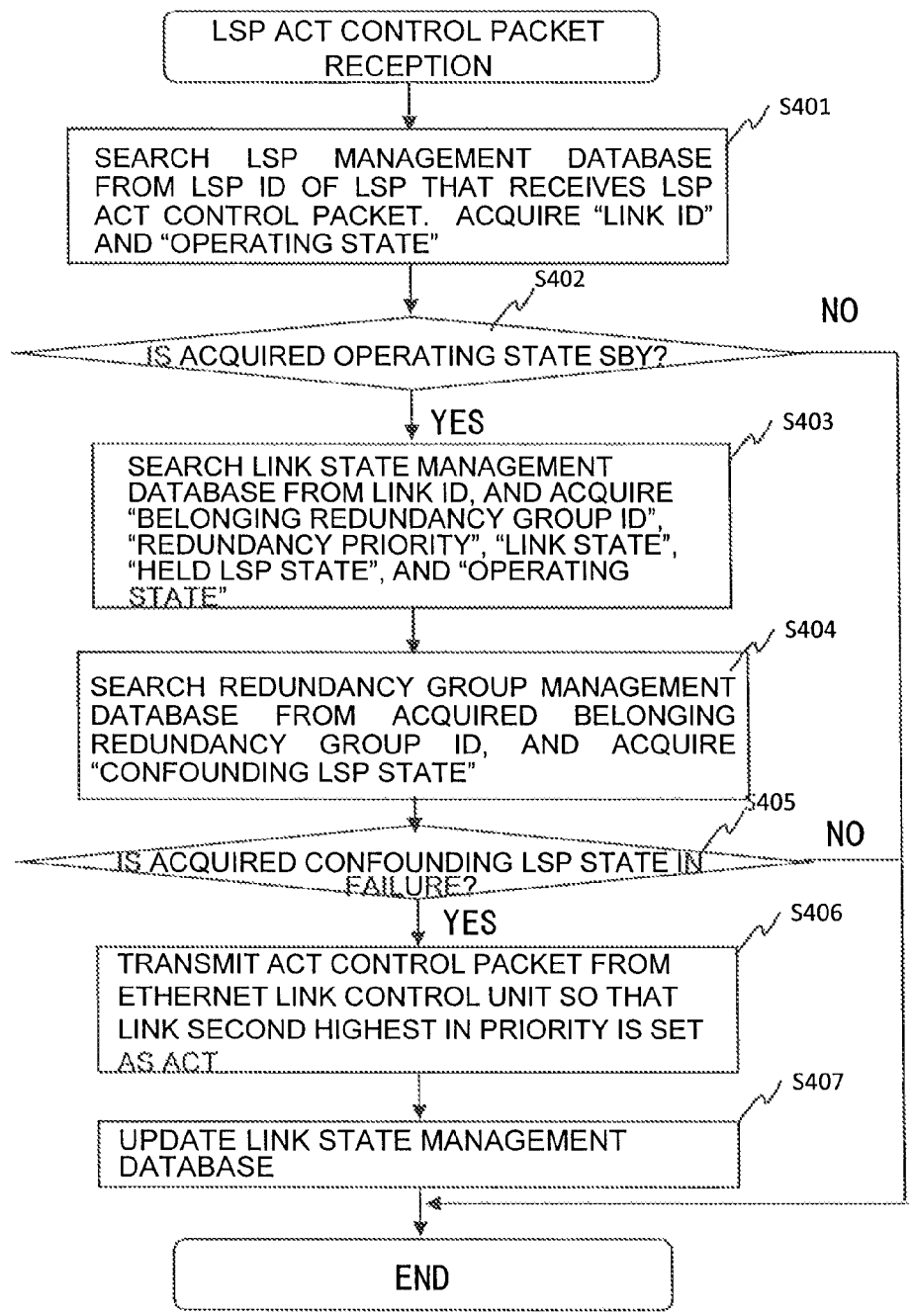
FIG. 11 is a flowchart illustrating an example of an LSP switching ACT control packet reception of the transport edge node according to the embodiment of the present invention.

However, when the communication LSP failure detection becomes later than the confounding LSP failure detection, there is a possibility that the Ethernet access link is not switched. Under the circumstances, a processing flow of FIG. 11 is provided so that the Ethernet access link can be normally switched to another even if this event occurs.

Subsequently, the operation processing when the TPE node receives the ACT control packet of LSP will be described with reference to FIG. 11.

When the TPE-1 node 10-1 or the TPE-2 node 10-2 receive the LSP ACT control packet, for example, the communication path control unit 83 searches the LSP management DB 93 from the LSP ID of the received ACT control packet, and acquires the corresponding link ID 222 and operating state 224 (S401).

The communication path control unit 83 determines whether the acquired operating state 224 is SBY, or not (S402).

If the determination result is "no", that is, the operating state 224 of the LSP has already been ACT, the processing is terminated with doing nothing. If the determination result is "yes", that is, the operating state 224 of the LSP is SBY, the switching processing is continued.

The communication path control unit 83 searches the link state management DB 92 on the basis of the acquired link ID 222, and acquires the corresponding belonging redundant group ID 212, the redundancy priority 213, the link state 214, the held LSP state 215, and the operating state 216 (S403).

The communication path control unit 83 searches the redundancy group management DB 91 on the basis of the acquired belonging redundant group ID 212, and acquires the corresponding confounding LSP state 207 (S404).

The communication path control unit 83 determines whether the acquired confounding LSP state 207 is in failure, or not (S405).

If the determination result is "no", that is, the confounding LSP state 207 is normal, the switching processing of the Ethernet access link can be implemented by the result of an exchange of the link state management DB between the TPE nodes belonging to the same redundancy group as described above. Therefore, the processing is terminated with doing nothing.

If the determination result is "yes", that is, the confounding LSP state 207 is in failure, a failure cause of the confounding LSP is the TPE node failure of the same redundancy group. Therefore, the switching processing is continued.

Subsequently, in order to make the Ethernet access link of the self-node ACT, the communication path control unit 83 transmits the ACT control packet from the Ethernet link control unit 81 to the Ethernet access link according to the redundancy priority 213 (S306). For example, the communication path control unit 83 transmits the ACT control packet to the Ethernet access link higher in the redundancy priority 213 among the Ethernet access links of the self-node.

Finally, the communication path control unit 83 updates the operating state of the link in the link state management DB 92 to ACT (S307).

With the execution of the switching processing described in FIG. 11, the communication LSP failure detection becomes later than the confounding LSP failure detection. As a result, the determination in S305 of the flowchart of FIG. 10 becomes "no", and this example can deal with an event in which the Ethernet access link is not switched.

According to this embodiment, all of the data center, the Ethernet access link, and the transport network (transport path, transport node) can be made redundant, and in one failure of the Ethernet access link, the transport path, and the transport node, the communication path that maintains the DC accessed by the user site can be provided.

Also, even when the DCE node failure is detected, the communication path to another data center can be provided, and the communication between the user site and the data center can be continued.

Second Embodiment

Hereinafter, a second embodiment of the present invention will be described in detail with reference to the accompanying drawings.

Figure 13:
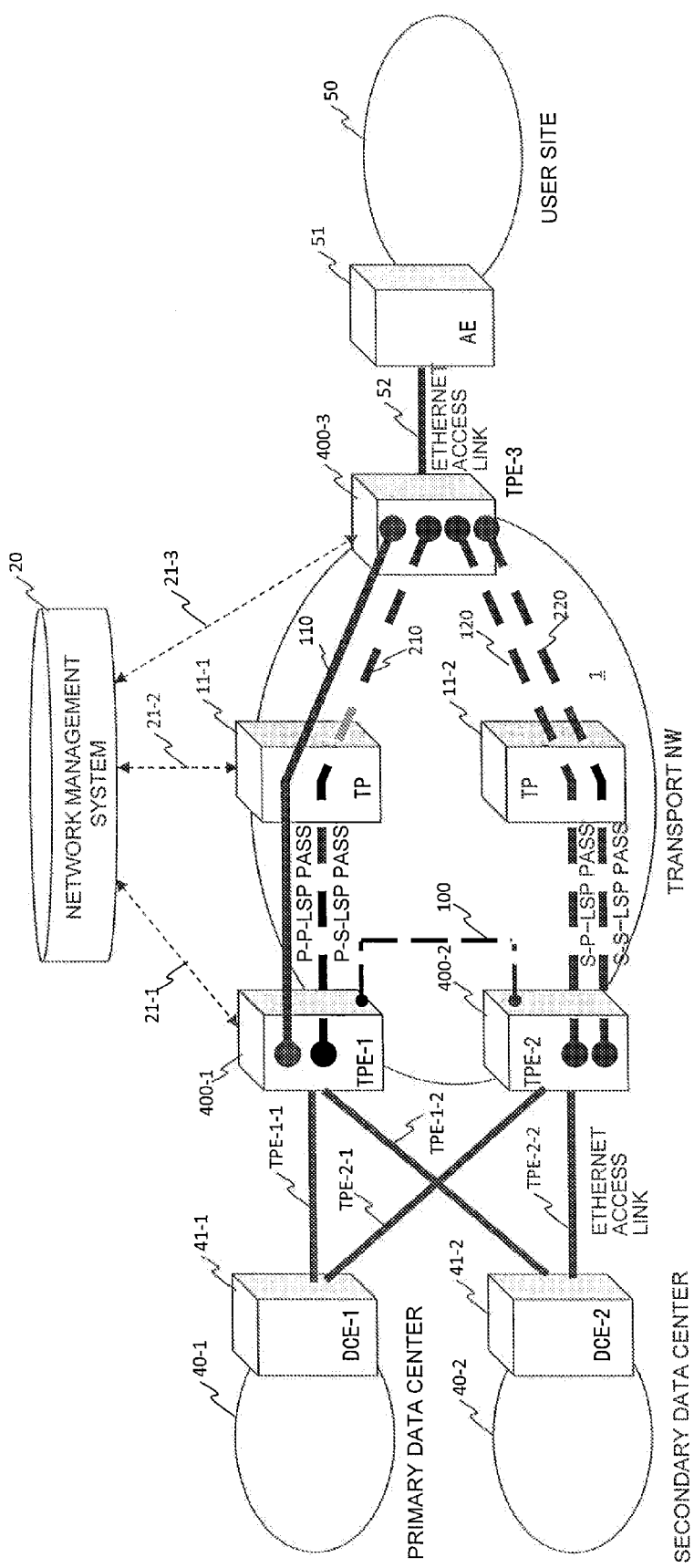
FIG. 13 is a diagram illustrating an example of a transport system according to a second embodiment of the present invention.

FIG. 13 is a diagram illustrating a network system configured by a packet transport device according to a second embodiment. In the second embodiment, a P-P (primary node-primary)-LSP 110, and a P-S (primary node-secondary)-LSP 210 are set between a TPE-1 node 400-1 and a TPE-3 node 400-3. Also, an S-P (secondary node-primary)-LSP 120, and an S-S (secondary node-secondary)-LSP 220 are set between a TPE-2 node 400-2 and the TPE-3 node 400-3. In this way, the LSPs are doubled between the respective TPE nodes. In the drawings, one solid among those four lines is prepared as an LSP of operation (ACT), and the remaining three dashed line LSPs are prepared as LSPs of standby (SBY) when a failure occurs. In this embodiment, both of the LSP between the TPE-1 node 400-1 and the TPE-3 node 400-3, and the LSP between the TPE-2 node 400-2 and the TPE-3 node 400-3 are made redundant. Only any one LSP may be made redundant.

In the example of FIG. 13, the P-P-LSP 110 is set as ACT, and the other LSPs are set as SBYs. If the P-P-LSP 110 between the TPE-1 and TPE-3 is in failure, the LSP of ACT is switched to the P-S-LSP 210 to continue the communication. In this way, because the communication can be continued by only switching the LSP when one LSP within a transport NW fails, a communication recovery can be realized at a higher speed than that when the LSP failure occurs in the first embodiment.

Also, when a failure of the Ethernet access link TPE-1-1 of the TPE-1 node 400-1 and a failure of the TPE-1 node 400-1 occur, the LSP of ACT is switched from the P-P-LSP 110 to the S-P-LSP 120, and a communication destination is switched to the path passing through the Ethernet access link TPE-2-1 of the TPE-2 node 400-2 to continue the communication. Further, if the DCE-1 node is in failure, the Ethernet access link is switched from the Ethernet access link TPE-1-1 to the TPE-1-2 (or TPE-2-2) to continue the communication. In this way, in addition, the communication continuity at the time of failure occurrence as in the first embodiment can be also provided.

In order to obtain the effects of the second embodiment, TPE nodes 400-n among the devices configuring the transport system have a function different from that of the first embodiment. The other devices may have the same configuration as that of the first embodiment, and therefore their description will be omitted.

Figure 14:
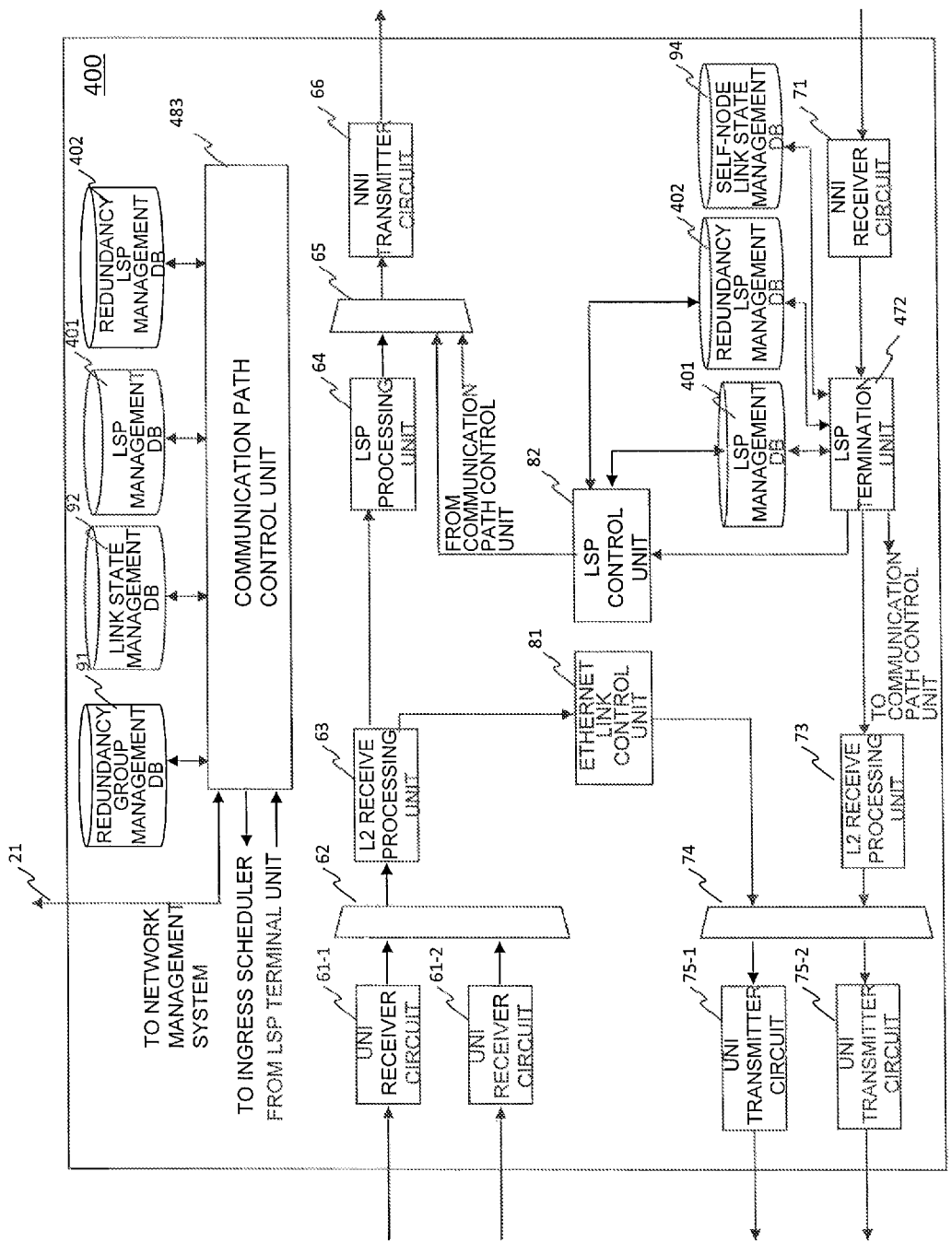
FIG. 14 is a block diagram illustrating an example of a transport edge node according to a second embodiment of the present invention.

FIG. 14 is a block diagram of the TPE nodes 400-n for realizing the configuration of the second embodiment. In the TPE node 400 according to the second embodiment, in order to realize the redundancy by two LSPs within the same TPE, a communication path control unit 483 and an LSP termination unit 472 are different from those in the first embodiment. The other configurations are identical with those of the TPE node in the first embodiment, and their description will be omitted.

The communication path control unit 483 of the TPE node 400 includes the redundancy group management DB 91, the link state management DB 92, an LSP management DB 401, and a redundant LSP management DB 402. Among those components, the redundancy group management DB 91 and the link state management DB 92 each have the same database as that of the first embodiment, and therefore its description will be omitted.

The communication path control unit 483 has the network management system 20 and the network management system connection IF, and reflects the setting information from the network management system 20 on the database provided in the transport edge node. Also, the communication path control unit 483 is connected to the scheduler 65 and the LSP termination unit 72.

Upon receiving an ACT/SBY switching request of the Ethernet access link line from the network management system 20, or an ACT/SBY switching request of the LSP, the communication path control unit 483 notifies the Ethernet link control unit 81 and the LSP control unit 82 of the switching requests. Further, the communication path control unit 483 has a function of implementing the ACT/SBY switching of the Ethernet access link line and the LSP so that a communication between the user site 50 and the data centers 40-n has no trouble, with a detection of the failure of the Ethernet access link line that connects the data centers 40-n and the user site, the failure of LSP, and the failure of the confounding LSP as a trigger. In order to realize the ACT/SBY switching when those failures occur, the communication path control unit 483 has a redundancy group management DB 91, the link state management DB 92, the LSP management DB 401, and the redundant LSP management DB 402 as described above. The LSP management DB 401 and the redundant LSP management DB 402 can be used between the LSP termination unit 472 and the LSP control unit 82.

The LSP termination unit 472 includes the LSP management DB 401, the redundant LSP management DB 402, and the self-node link state management DB 94. Among those components, the self-node link state management DB 94 has the same database as that in the first embodiment, and therefore its description will be omitted.

The LSP management DB 401 according to the second embodiment will be described with reference to FIG. 15. The LSP management DB 401 includes an LSP ID 221, a link ID 222 that designates the Ethernet access link to which the LSP belongs, an LSP state 223 that holds a state (normal/abnormal) of the MPLS path, an operating state 224 that holds an operating state (operating state (ACT) or nonoperating state (SBY) when the LSP is redundant) of the LSP, and an LSP group ID (management ID for managing the LSPs of the group when the LSP is redundant) 411.

The LSP ID 221, the link ID 222, the LSP state 223, and the operating state 224 are the same contents as those of the first embodiment.

The redundant LSP management DB 402 according to the second embodiment will be described with reference to FIG. 16. The redundant LSP management DB 402 includes an LSP group ID 411, a P-PLSP ID 412 and a P-SLSP ID 413 which store two LSPs belonging to the primary node, and a field S-PLSP ID 414 and an S-S system LSP ID 415 which store two LSPs belonging to the secondary node.

Hereinafter, the switching operation when the failure occurs will be described with reference to flowcharts of FIGS. 17 to 21.

Figure 17A:
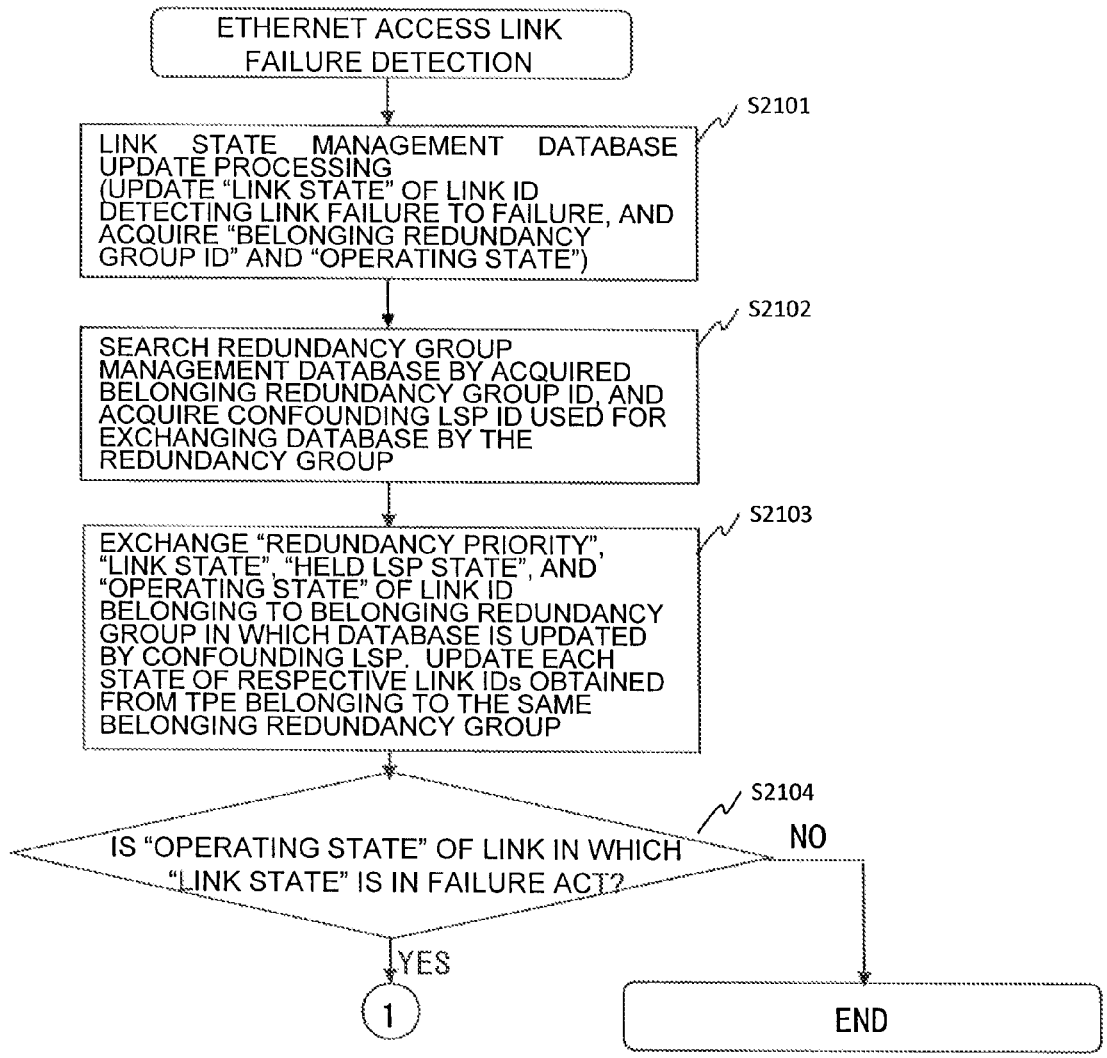
FIG. 17A is a flowchart illustrating an example of a link failure detection of the transport edge node according to the second embodiment of the present invention (1/2)
Figure 17B:
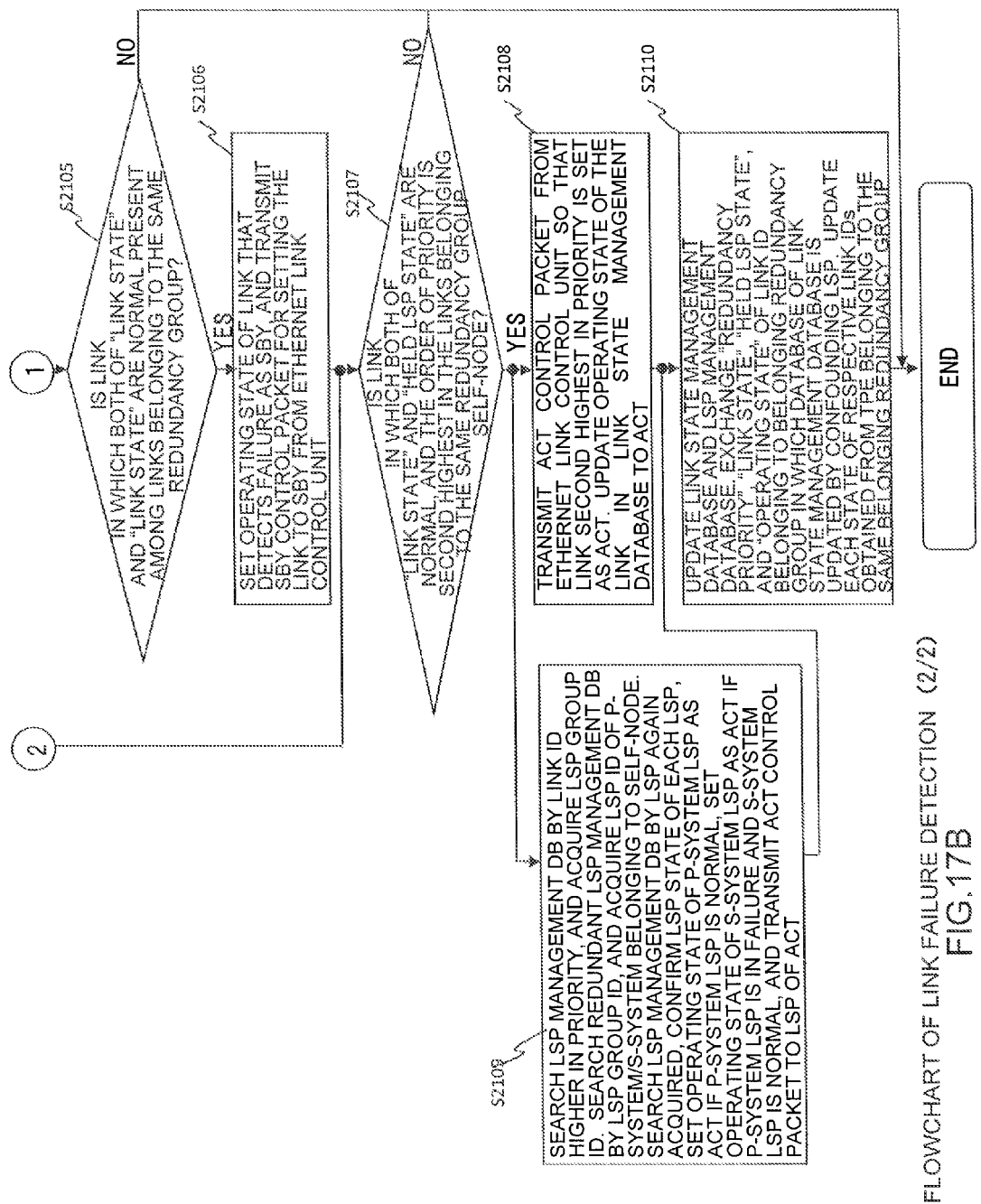
FIG. 17B is a flowchart illustrating an example of the link failure detection of the transport edge node according to the second embodiment of the present invention (2/2)

First, the operation of the TPE node at the time of detecting the Ethernet access link failure will be described with reference to flowcharts of FIGS. 17A and 17B.

The processing when the Ethernet access link failure occurs is identical with that in the first embodiment except for S2109. The operation of S2109 different from the processing in the first embodiment will be described.

In order to maintain the communication paths to the identical data center when the Ethernet access link failure occurs, the Ethernet access link of the TPE node 400 and the LSP are switched to others. S2109 is the switching processing of the LSP.

The communication path control unit 483 searches the LSP management DB 401 according to the link ID (link ID of switching destination) higher in the order of priority, and acquires the corresponding LSP group ID 411. The communication path control unit 483 searches the redundant LSP management DB 402 according to the LSP group ID 411, and acquires the LSP ID of P system/S system belonging to the self-node. The communication path control unit 483 again searches the LSP management DB 401 according to the acquired LSP ID, and confirms the LSP state 223 of the respective LSPs. The communication path control unit 483 sets the operating state 224 of the P-system LSP to ACT if the P-system LSP is normal, sets the operating state 224 of the S-system LSP to ACT if the P-system LSP is in failure and the S-system LSP is normal, and transmits the ACT control packet to the LSP of ACT (S2109).

With the above configuration, only one LSP of the two LSPs belonging to the TPE node 400 is set as ACT so that the communication path within the transport network 1 can be ensured.

Subsequently, the operation of the TPE node when the LSP failure occurs will be described with reference to FIG. 18. The processing when the LSP failure occurs is identical with that in the first embodiment except for the processing of S2201, S2208, S2209, and S2210. The operation of S2201, S2208, S2209, and S2210, which is different from the processing of the first embodiment, will be described.

In the second embodiment, because the LSP between the TPE nodes 400 within the transport network 1 is made redundant, the communication can be continued without switching the TPE node connected with the data center when one LSP is in failure. For that reason, the processing becomes S2201, S2208, S2209, and S2210.

First, the communication path control unit 483 acquires information related to the failed LSP from the LSP management DB 401 and the redundant LSP management DB 402. For example, the communication path control unit 483 updates the LSP state 223 corresponding to the LSP ID of the LSP that detects the failure to "failure" for the LSP management DB 401, updates the operating state 224 to "SBY", and acquires the link ID 222 to which the LSP belongs from the LSP management DB 401 (S2201). Also, the communication path control unit 483 acquires another LSP ID corresponding to the LSP ID of the LSP that detects the failure, from the redundant LSP management DB 402. The acquired LSP ID is an ID of the LSP belonging to the same LSP group as that of the ISP that detects the failure.

Subsequently, the communication path control unit 483 determines whether the LSP state 223 of another LSP (except for the failed LSP) belonging to the same LSP group, which is acquired from the redundant LSP management DB 402, is normal, or not (S2208). If the determination result is no, another LSP belonging to the same LSP group is also in failure, and the LSP switching cannot be conducted. Therefore, the processing subsequent to S2202 is executed (description will be omitted because of the same operation as that in the first embodiment). If another LSP belonging to the same LSP group is normal, the determination result becomes yes, and the processing in S2209 is executed in order to execute the switching processing of the LSP.

Subsequently, it is determined whether the operating state 224 of the failed LSP is ACT, or not (S2209). If the determination result is no, when the LSP in which the operating state 224 is SBY is in failure, the failure does not adversely affect the current communication. Therefore, since there is no need to switch the LSP to another, the processing is terminated. If the determination result is yes, when the LSP in which the operating state 224 is ACT is in failure, the failure adversely affects the current communication. Therefore, since there is a need to switch the LSP to another, the flow proceeds to the LSP switching processing.

Subsequently, the operating state 224 of the LSP belonging to the same LSP group, and belonging to the same TPE node is set as ACT, and the ACT control packet in which the LSP is ACT is transmitted from the LSP control unit (LSP OAM/protection control unit) 82 (S2210). With the above configuration, because the ACT control packet can be transferred between the TPE nodes having the termination point of the LSP, the LSP used for communication is switched to another.

The other processing in FIG. 18 is the same operation as that of the first embodiment, and therefore its description will be omitted.

Subsequently, a processing flowchart when the confounding LSP failure occurs will be described. All of the processing when the confounding LSP failure occurs is identical with that in the first embodiment except for the determination processing of S2305. The operation of S2305, which is different from the processing of the first embodiment, will be described.

In the second embodiment, because the LSP of the same TPE node is redundantly set, it is determined whether both of the two LSPs belonging to the same LSP group are SBY, or any LSP is ACT (S2305).

If both of the two LSPs are SBY, the determination result is no, and the processing is terminated. Also, if any LSP is ACT, the determination result is yes, and the processing of S2306 is executed.

Figure 19:
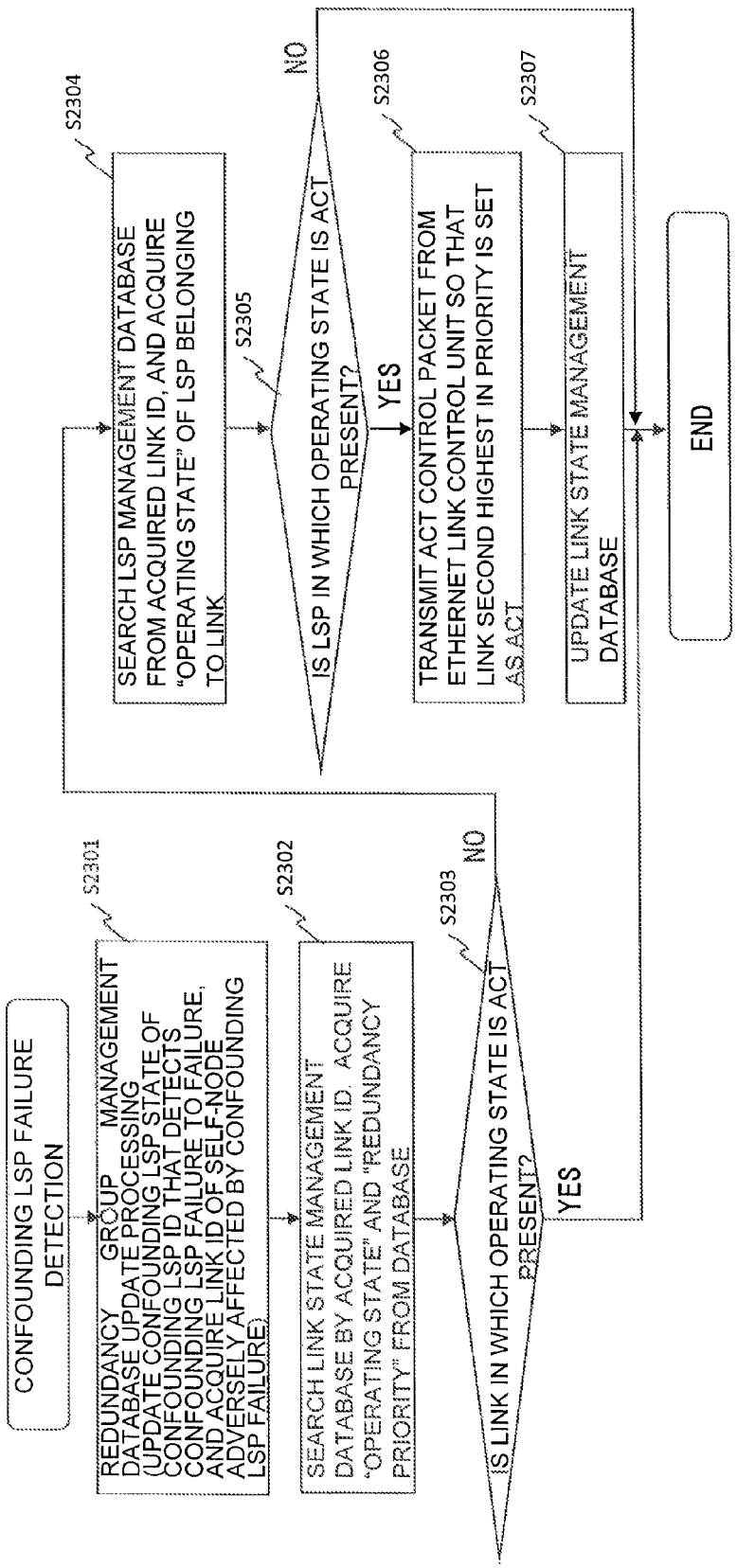
FIG. 19 is a flowchart illustrating an example of a confounding LSP failure detection of the transport edge node according to the second embodiment of the present invention.

The other processing in FIG. 19 is the same operation as that in the first embodiment, and therefore its description will be omitted.

Figure 20:
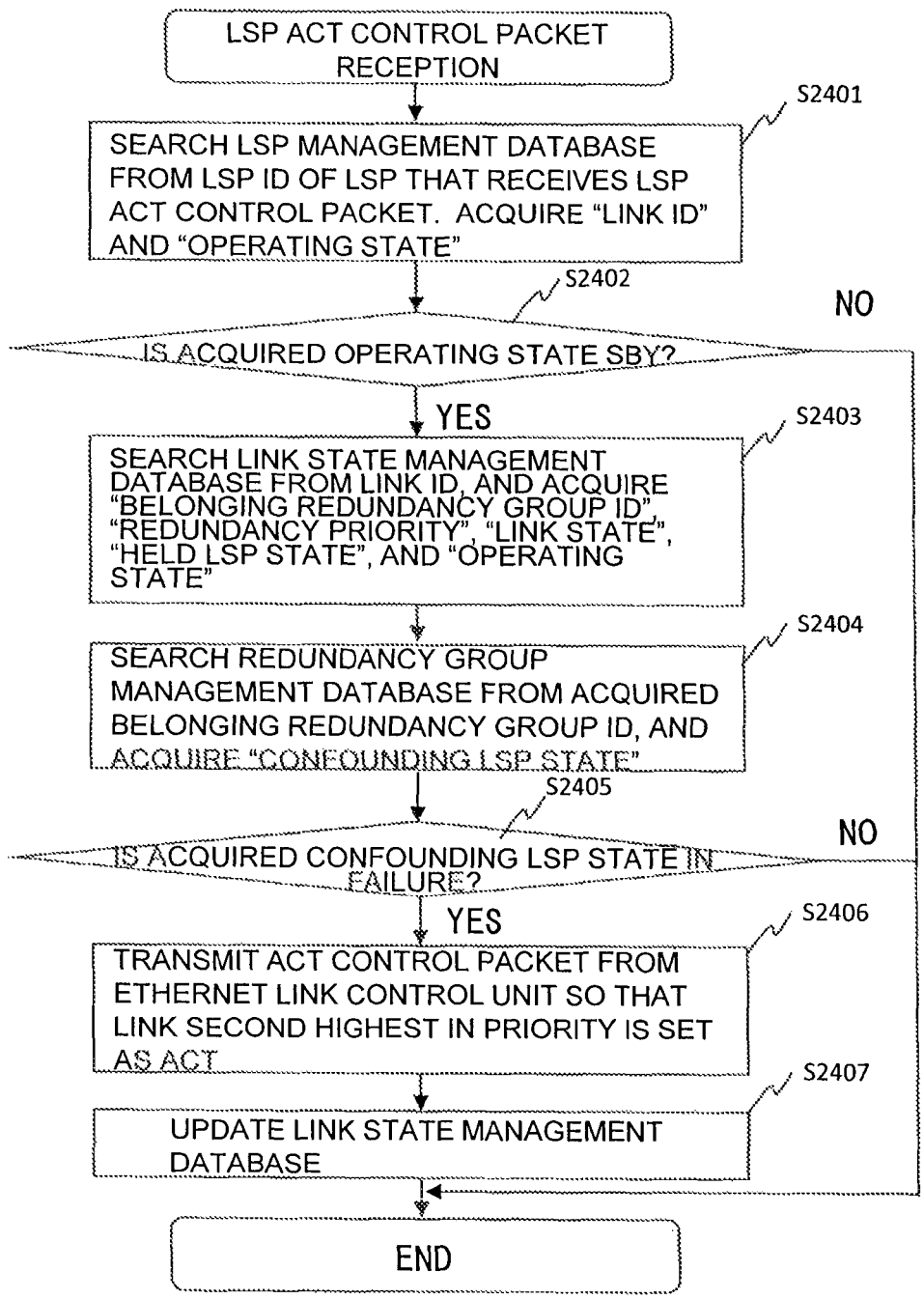
FIG. 20 is a flowchart illustrating an example of an LSP switching ACT control packet reception of the transport edge node according to the second embodiment of the present invention.
Figure 21:
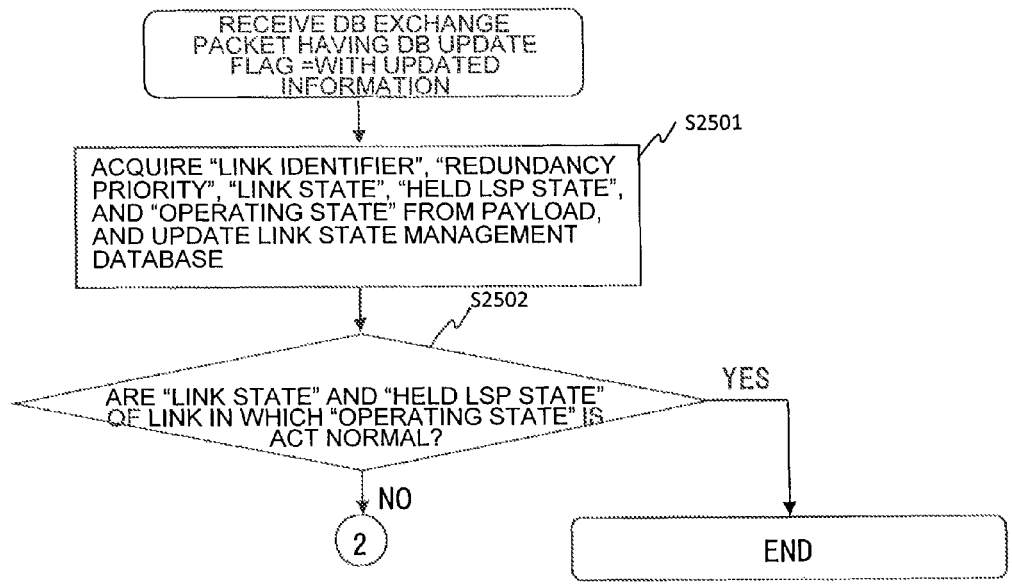
FIG. 21 is a diagram illustrating an example of a case in which the transport edge node receives a DC exchange notification packet in which a DB update flag is indicative of information updated from the confounding LSP according to the second embodiment of the present invention.

FIG. 20 is a flowchart when receiving the LSP switching ACT control packet, and FIG. 21 is a flowchart when receiving the DB exchange packet 300 in which the DB update flag 304 is indicative of "with updated information" from the confounding LSP. Those flowcharts are the same operation as that of the first embodiment, and therefore their description will be omitted.

According to this embodiment, all of the data center, the Ethernet access link, and the transport network (transport path, transport node) can be made redundant, and in one failure of the Ethernet access link, the transport path, and the transport node, the communication path that maintains the DC accessed by the user site can be provided. Also, because the communication path can be provided without changing the TPE node to the DC accessed by the user site in the LSP failure switching, a communication disconnection time when the failure occurs can be shortened.

Also, even if the DCE node failure is detected, the communication path to another data center can be provided, and the communication between the user site and the data center can be continued.

The above-mentioned respective embodiments are described with the use of the LSP, but other appropriate paths may be used, or appropriate communication paths may be applied. Also, the above-mentioned respective embodiments are described with the use of the Ethernet access link, but other appropriate links may be used, or appropriate communication paths may be applied.

Configuration Example

One aspect of the present communication system comprising:

a first communication device that is arranged between a first network and a second network, communicates with a first device of the first network through a first access link, communicates with a second device, which is made redundant with the first device, of the first network through a second access link, and communicates with a third device of the second network through a first path;

a second communication device that is arranged between the first network and the second network, communicates with a first device of the first network through a third access link, communicates with the second device of the first network through a fourth access link, and communicates with the third device of the second network through a second path; and a synchronization information communication path between the first communication device and the second communication device, wherein the first communication device and the second communication device each manage synchronization information including link identifiers of the first to fourth access links of the first communication device and the second communication device, link state information indicating that the first to fourth access links are normal or in failure, and path state information indicating that the first and second paths configuring a communication path between the third device and the first or second device with paired with the first to fourth access links are normal or in failure, through the synchronization information communication path, in synchronization, and the first communication device and the second communication device control switching of the first to fourth access links of the first network, and switching of the first and second paths of the second network on the basis of the synchronized information to switch the communication path between the third device and the first or second device to another.

With the above configuration, the path in the first network, the path in the second network, and the communication device between the first network and the second network can be made redundant, the redundant communication device can switch the path extended between the first network and the second network to another.

Also, when detecting a failure of any one of the first path, the first communication device, and the first access link in a communication path between the third device and the first device through the first path, the first communication device, and the first access link, at least one of the first communication device and the second communication device may switch from the first path to the second path, and may switch from the first access link to the third access link to continue a communication between the third device and the first device on the basis of the synchronized information.

With the above configuration, when the failure is detected, the communication path can be switched to another without changing the access destinations of the redundant first device and second device.

In this case, the second communication device may transmit a control packet for bringing the third access link into an active system of the third access link when switching from the first access link of the first communication device to the third access link of the subject second communication device.

With the above configuration, the second communication device can set the third access link as the operating system.

Also, at least one of the first communication device and the second communication device may have a database in which the order of priority of the first to fourth access links is stored in advance, the order of priority may be set so that the third access link of the second communication device is subsequent to at least the first access link of the first communication device, and at least one of the first communication device and the second communication device may switch from the first access link to the third access link according to the order of priority.

With the above configuration, the switching priority order of the first to fourth access links can be set in advance, and if the first communication device side is in failure, the communication path can be switched to the third access link of the second communication device.

Also, the order of priority may be set in the stated order of the first access link of the first communication device, the third access link of the second communication device, the second access link of the first communication device, and the fourth access link of the second communication device, and at least one of the first communication device and the second communication device may switch the first to fourth access links to another according to the order of priority.

With the above configuration, when the first communication device side is in failure, the communication path can be first switched to another without changing the access destination of the first device and the second device which are redundantly configured, and then switched to the communication path whose access destination is changed.

Also, at least one of the first communication device and the second communication device may have a database in which the order of priority of the first to fourth access links is stored in advance, and when detecting a failure of the active access link among the first to fourth access links, if the access link higher in the order of priority among the access links indicating that the link state information is normal is an access link of the subject communication device, the subject access link may be brought into an active system.

With the above configuration, when the failure of the access link is detected, the communication path can be switched to another.

In this case, at least one of the first communication device and the second communication device may further bring the first or second path in the active system when the access link higher in the order of priority is an access link of the subject communication device, and the first or second path of the subject communication device and the third device is of an inactive system.

With the above configuration, when the failure of the access link is detected, the path can be switched to the operating system as occasion demands. For example, if the path is not switched to the operating system by another communication device, the path can be switched to the operating system at the initiative of the subject communication device.

Also, at least one of the first communication device and the second communication device may have a database in which the order of priority of the first to fourth access links is stored in advance, when one of the first communication device and the second communication device detects a failure of the active path of the first and second paths, the one communication device may update path state information of the active path to failure, after updating, the first communication device and the second communication device may exchange the synchronization information with each other through the communication path for synchronization, and the other of the first communication device and the second communication device may bring the access link higher in the order of priority among the access links indicating that the link state information is normal into the active system.

With the above configuration, when the failure of the path is detected, the communication path can be switched to another.

In this case, the other of the first communication device and the second communication device may receive a control packet transmitted from the third device that detects a failure of the first path or the second path, and may bring the first path or the second path of the subject communication device into the active system, or may transmit the control packet for bringing the first or second path of the subject communication device into the active system.

With the above configuration, if one of the communication devices detects the failure of the path, the other communication device can switch the path to the operating system.

Also, the synchronization information may include link active information indicating whether the first to fourth access links are an active system or an inactive system, and path active information indicating whether the first and second paths are the active system or the inactive system, one of the first communication device and the second communication device may receive a control packet, which is transmitted from the third device when one of the first path and the second path fails, for bringing the other of the first path and the second path into an active system, and may update the path active information of the path to the active system, and when one of the first communication device and the second communication device does not synchronize the synchronization information with the other of the first communication device and the second communication device, if the link active information of the subject communication device is of the inactive system, and the path active information of the subject communication device is of the active system, the access link higher in the order of priority among the access links indicating that the link state information is normal may be brought into the active system.

With the above configuration, if any one of the first and second communication devices fails, and those communication devices are not synchronized with each other, the communication path can be switched to another.

Also, the first communication device and the second communication device may exchange the synchronization information with each other in a predetermine cycle, and the first communication device and the second communication device may exchange the synchronization information with each other regardless of the cycle if the synchronization information is changed due to a failure of the access link and the path.

With the above configuration, the synchronization can be speeded up.

Also, the protocol of the first network and the protocol of the second network may be different from each other, the first communication device and the second communication device may switch a path extended between the third device and the first or second device through the first network of a first protocol, the first communication device, and the second network of a second protocol to a path extended through the first network, the second communication device, and the second network.

With the above configuration, under the environment in which two or more kinds of redundancy protocols are mixed together, the end-to-end redundant path of the communication path can be provided.

Also, at least one of the first path and the second path may be further made redundant, and any one of the first communication device and the second communication device may be switched to a redundant path.

With the above configuration, the paths between the communication devices are made redundant, and the path is switched to another when the path is in failure so that the communication can be continued.

Other Configuration Examples

The communication device can be configured as follows.

For example, there is provided a communication device having a first access link connected to a first communication device, a second access link connected to a second communication device, and a first transport path connected to a third communication device that holds a network user, the communication device including:

a link control unit that makes the access link redundant, and conducts operating and nonoperating controls of the access link;

a path control unit that conducts the operating and nonoperating controls of the transport path;

a confounding communication path of a third access link connected to the first communication device, a fourth access link connected to the second communication device, and a fifth communication device having a second transport path connected with a third communication device; and an operating state management database that retains a database which retains operating and nonoperating states of the access links, operating and nonoperating states of the transport paths, and failure presence/absence of the access links and the transport paths, operating and nonoperating states of the access links of the fifth communication device, operating and nonoperating states of the transport paths, and failure presence/absence of the access links and the transport paths, in which the operating and nonoperating states of the access links and the transport paths in the database are set so that only a communication path between a network utilization user connected to the third communication device, and only any one of the first communication device and the second communication device can be maintained.

In the above communication device, the information of the operating state management database of the fifth communication device is retained.

In the above communication device, the information of the operating state management database is regularly exchanged in a given cycle between the above communication device and the fifth communication device to always synchronize the operating state management database.

In the above communication device, the order of priority of the first to fourth access links is provided in the operating state management database, in the above communication device, if the order of priority of the first access link of the self-node is "1" highest the order of priority, "2" second highest in the order of priority is the third access link of the fifth communication device, "3" third highest in the order of priority is the second access link of the self-node, and "4" lowest in the order of priority is the fourth access link of the fifth communication device.

In the above communication device, the control is conducted so that the transport path of the communication device having the active access link among the above access links or the fifth communication device is rendered active.

In the above communication device, when the failure of the active access link among the above access links is detected, the above failure information is exchanged between the above communication device and the fifth communication device with the use of the above confounding communication path to synchronize the operating state management database, and the Ethernet access link which is second highest in the order of priority of the access link, and normal is made active, whereby the operating/nonoperating of the active transport path is controlled.

In the above communication device, when the failure of the active transport path is detected, the above failure information is exchanged between the above communication device and the fifth communication device with the use of the confounding communication path to synchronize the operating state management database, the access link to which the above transport path belongs is made standby, the Ethernet access link which is second highest in the order of priority of the access link, and normal is made active, whereby the operating/nonoperating of the active transport path is controlled.

In the above communication device, when the failure of the confounding communication path is detected, if the above communication device having the nonoperating transport path receives a control packet for switching the transport path to the active state from the third communication device, the communication device reads the order of priority of the access links and failure information of the access links from the operating state management database; and the access link which is higher in the order of priority and normal is rendered active.

In the above communication device, when the operating state management database of the subject device is changed due to the failure of the access link or the transport path, the information of the operating state management database is exchanged regardless of the above given cycle to speed up the synchronization of the operating state management database.

The present invention is not limited to the above embodiments, but includes various modified examples. For example, in the above-mentioned embodiments, in order to easily understand the present invention, the specific configurations are described. However, the present invention does not always provide all of the configurations described above. Also, a part of one configuration example can be replaced with another configuration example, and the configuration of one embodiment can be added with the configuration of another embodiment. Also, in a part of the respective configuration examples, another configuration can be added, deleted, or replaced.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

What is claimed is:

1. A communication system comprising:
a first communication device that is arranged between a first network and a second network, communicates with a first device of the first network through a first access link, communicates with a second device, which is made redundant with the first device, of the first network through a second access link, and communicates with a third device of the second network through a first path;
a second communication device that is arranged between the first network and the second network, communicates with a first device of the first network through a third access link, communicates with the second device of the first network through a fourth access link, and communicates with the third device of the second network through a second path; and
a synchronization information communication path between the first communication device and the second communication device, wherein
the first communication device and the second communication device each manage synchronization information including link identifiers of the first to fourth access links of the first communication device and the second communication device, link state information indicating that each of the first to fourth access links is normal or in failure, and path state information indicating that the first and second paths configuring a communication path between the third device and the first or second device with paired with the first to fourth access links are normal or in failure, through the synchronization information communication path, in synchronization, and
the first communication device and the second communication device control switching of the first to fourth access links of the first network, and switching of the first and second paths of the second network on the basis of the synchronized synchronization information to switch the communication path between the third device and the first or second device to another.

2. The communication system according to claim 1, wherein when detecting a failure of any one of the first path, the first communication device, and the first access link in a communication path between the third device and the first device through the first path, the first communication device, and the first access link, at least one of the first communication device and the second communication device switches from the first path to the second path, and switches from the first access link to the third access link to continue a communication between the third device and the first device on the basis of the synchronized information.

3. The communication system according to claim 2, wherein the second communication device transmits a control packet for bringing the third access link into an active system of the third access link when switching from the first access link of the first communication device to the third access link of the subject second communication device.

4. The communication system according to claim 1, wherein at least one of the first communication device and the second communication device has a database in which the order of priority of the first to fourth access links is stored in advance, the order of priority is set so that the third access link of the second communication device is subsequent to at least the first access link of the first communication device, and at least one of the first communication device and the second communication device switches from the first access link to the third access link according to the order of priority.

5. The communication system according to claim 4, wherein
the order of priority is set in the stated order of the first access link of the first communication device, the third access link of the second communication device, the second access link of the first communication device, and the fourth access link of the second communication device, and at least one of the first communication device and the second communication device switches the first to fourth access links to another according to the order of priority.

6. The communication system according to claim 1, wherein at least one of the first communication device and the second communication device has a database in which the order of priority of the first to fourth access links is stored in advance, and when detecting a failure of the active access link among the first to fourth access links, if the access link higher in the order of priority among the access links indicating that the link state information is normal is an access link of the subject communication device, the subject access link is brought into an active system.

7. The communication system according to claim 6, wherein at least one of the first communication device and the second communication device further brings the first or second path in the active system when the access link higher in the order of priority is an access link of the subject communication device, and, the first or second path of the subject communication device and the third device is of an inactive system.

8. The communication system according to claim 1, wherein at least one of the first communication device and the second communication device has a database in which the order of priority of the first to fourth access links is stored in advance, when one of the first communication device and the second communication device detects a failure of the active path of the first and second paths, the one communication device updates path state information of the active path to failure, after updating, the first communication device and the second communication device exchange the synchronization information with each other through the communication path for synchronization, and the other of the first communication device and the second communication device brings the access link higher in the order of priority among the access links indicating that the link state information is normal into the active system.

9. The communication system according to claim 8, wherein the other of the first communication device and the second communication device receives a control packet transmitted from the third device that detects a failure of the first path or the second path, and brings the first path or the second path of the subject communication device into the active system, or transmits the control packet for bringing the first or second path of the subject communication device into the active system.

10. The communication system according to claim 1, wherein the synchronization information includes link active information indicating whether the first to fourth access links are an active system or an inactive system, and path active information indicating whether the first and second paths are the active system or the inactive system, one of the first communication device and the second communication device receives a control packet, which is transmitted from the third device when one of the first path and the second path fails, for bringing the other of the first path and the second path into an active system, and updates the path active information of the path to the active system, and when one of the first communication device and the second communication device does not synchronize the synchronization information with the other of the first communication device and the second communication device, if the link active information of the subject communication device is of the inactive system, and the path active information of the subject communication device is of the active system, the access link higher in the order of priority among the access links indicating that the link state information is normal is brought into the active system.

11. The communication system according to claim 1, wherein the first communication device and the second communication device exchange the synchronization information with each other in a predetermine cycle, and the first communication device and the second communication device exchange the synchronization information with each other regardless of the cycle if the synchronization information is changed due to a failure of the access link and the path.

12. The communication system according to claim 1, wherein the protocol of the first network and the protocol of the second network are different from each other, the first communication device and the second communication device switch a path extended between the third device and the first or second device through the first network of a first protocol, the first communication device, and the second network of a second protocol to a path extended through the first network, the second communication device, and the second network.

13. The communication system according to claim 1, wherein at least one of the first path and the second path is further made redundant, and any one of the first communication device and the second communication device is switched to a redundant path.

14. A path switching method in a communication system comprising:

a first communication device that is arranged between a first network and a second network, communicates with a first device of the first network through a first access link, communicates with a second device, which is made redundant with the first device, of the first network through a second access link, and communicates with a third device of the second network through a first path; and a second communication device that is arranged between the first network and the second network, communicates with a first device of the first network through a third access link, communicates with the second device of the first network through a fourth access link, and communicates with the third device of the second network through a second path, wherein the first communication device and the second communication device each manage synchronization information including link identifiers of the first to fourth access links of the first communication device and the second communication device, link state information indicating that each of the first to fourth access links is normal or in failure, and path state information indicating that the first and second paths are normal or in failure, in synchronization between the first communication device and the second communication device, and the first communication device and the second communication device control switching of the first to fourth access links of the first network, and switching of the first and second paths of the second network on the basis of the synchronized synchronization information to switch the communication path between the third device and the first or second device to another.

15. A communication device used as a first or second communication device in a communication system comprising:

the first communication device that is arranged between a first network and a second network, communicates with a first device of the first network through a first access link, communicates with a second device, which is made redundant with the first device, of the first network through a second access link, and communicates with a third device of the second network through a first path; and the second communication device that is arranged between the first network and the second network, communicates with a first device of the first network through a third access link, communicates with the second device of the first network through a fourth access link, and communicates with the third device of the second network through a second path, the communication device comprising:

a database that stores synchronization information including link identifiers of the first to fourth access links of the first communication device and the second communication device, link state information indicating that each of the first to fourth access links is normal or in failure, and path state information indicating that the first and second paths are normal or in failure, and a communication path control unit that manages the synchronization information in synchronization with the first communication device or the second communication device which is paired, and controls switching of the first to fourth access links of the first network, and switching of the first and second paths of the second network on the basis of the synchronized synchronization information to switch the communication path between the third device and the first or second device to another.

* * * * *